March 11, 1958 C. G. JOHNSON 2,826,418
RECORD HOLDING MECHANISM
Filed April 21, 1954 16 Sheets-Sheet 1

Inventor
Carl G. Johnson
By John F. Eakins
Attorney

March 11, 1958     C. G. JOHNSON     2,826,418
RECORD HOLDING MECHANISM
Filed April 21, 1954                                16 Sheets-Sheet 2

Inventor
Carl G. Johnson
By John F. Eakins
Attorney

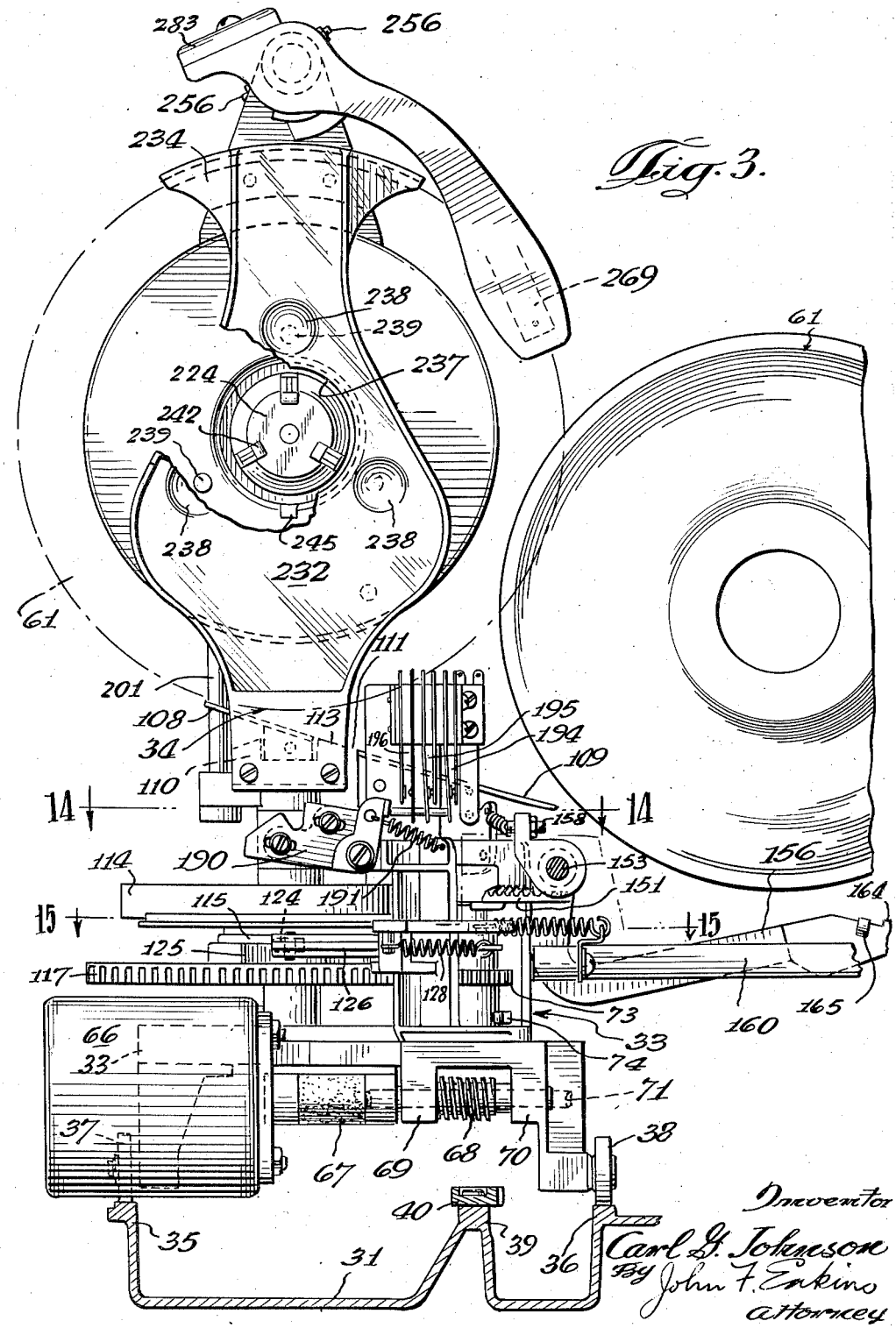

March 11, 1958 C. G. JOHNSON 2,826,418
RECORD HOLDING MECHANISM
Filed April 21, 1954 16 Sheets-Sheet 4
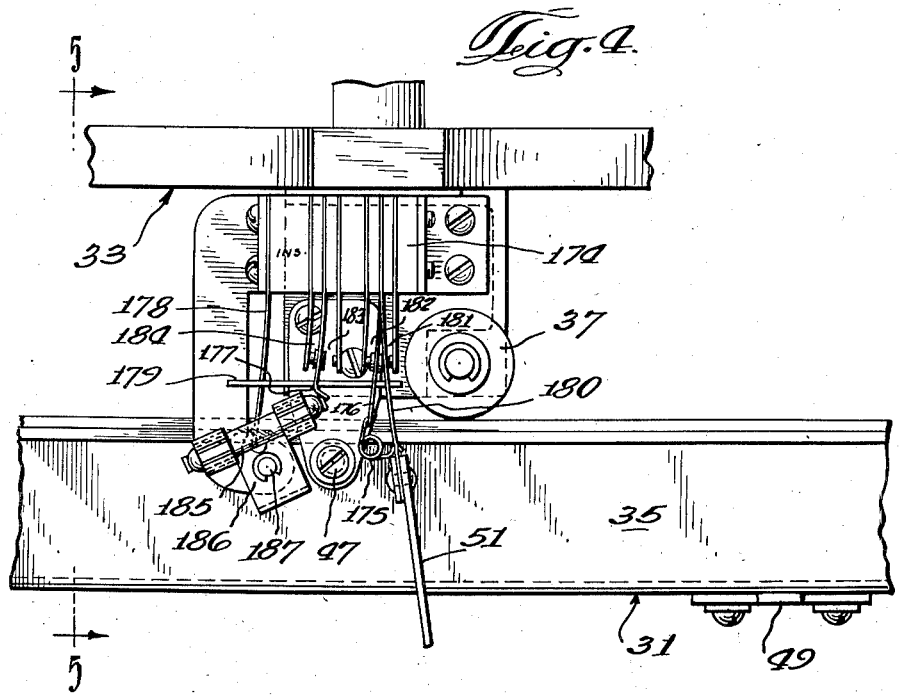
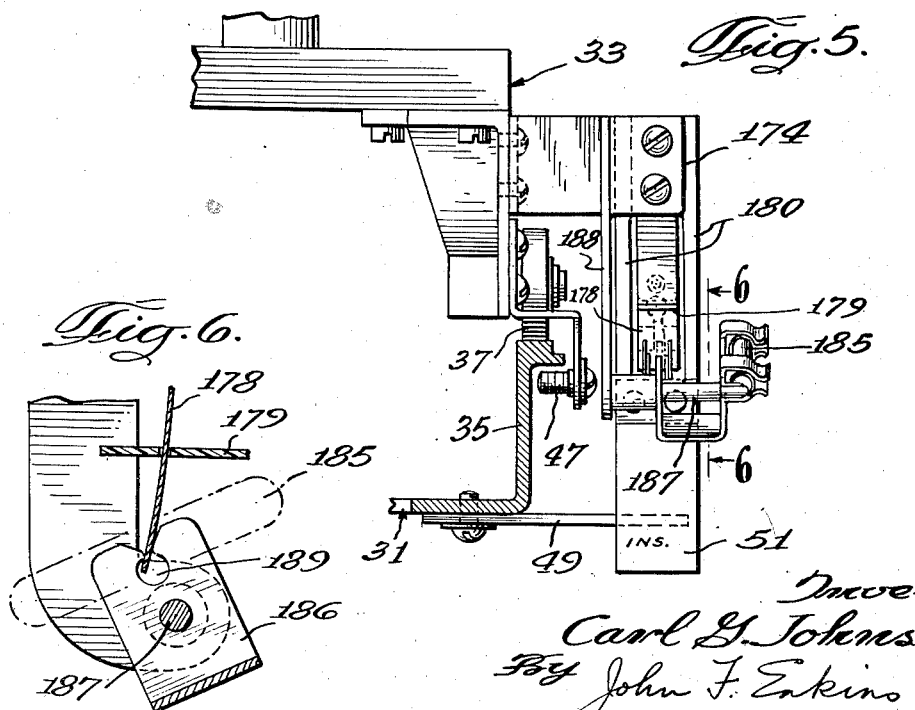
Inventor
Carl G. Johnson
By John F. Enkins
Attorney

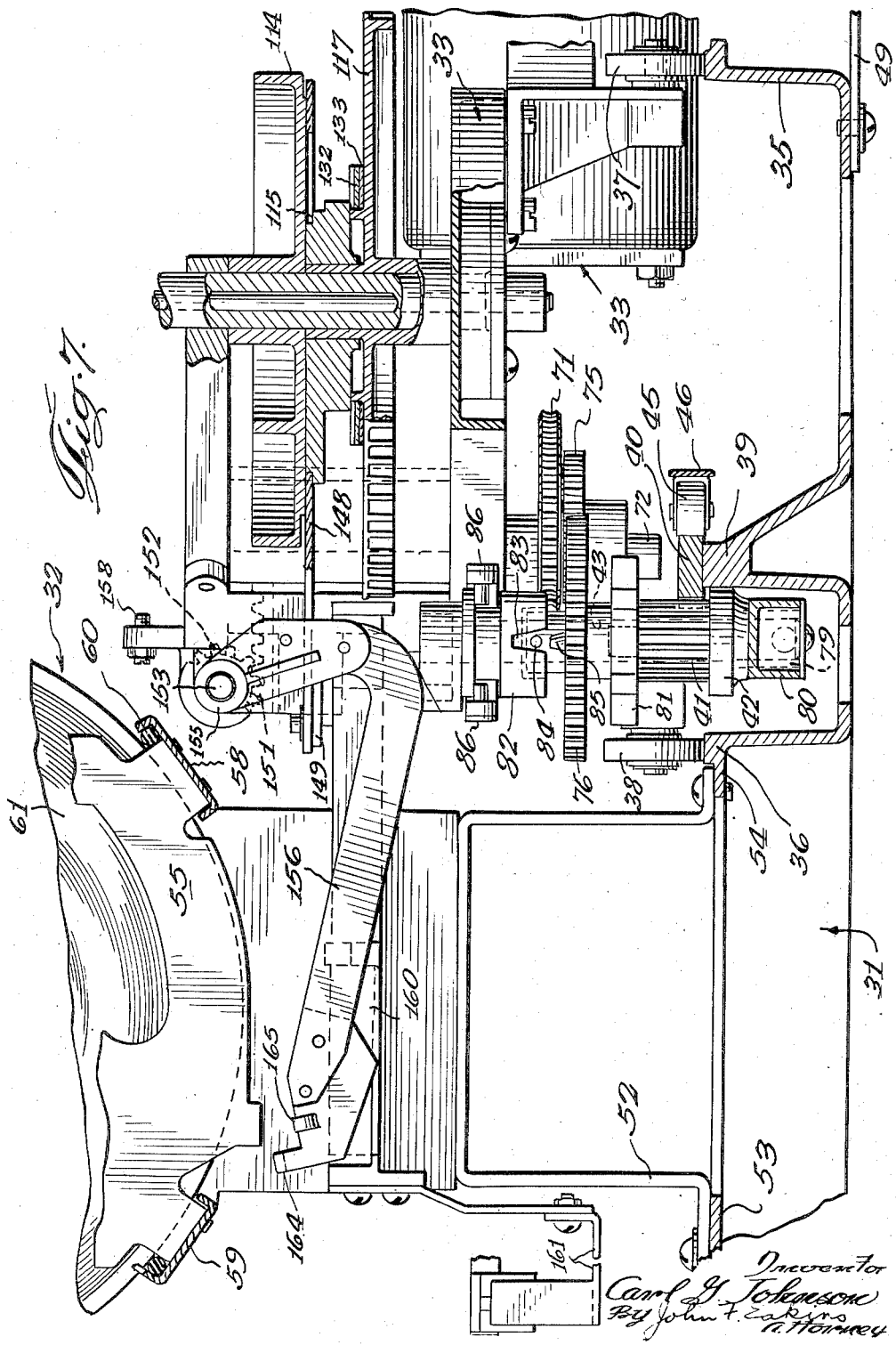

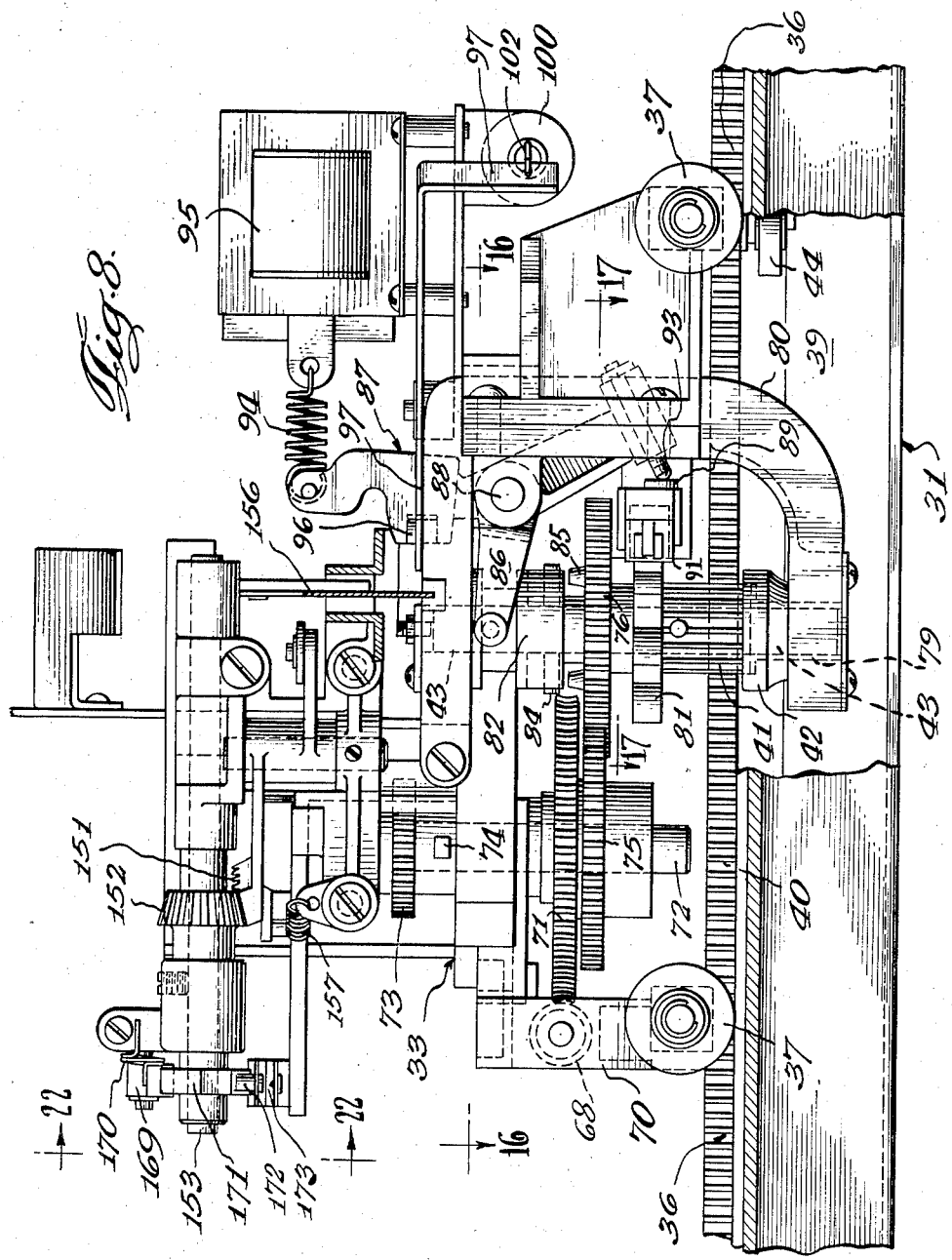

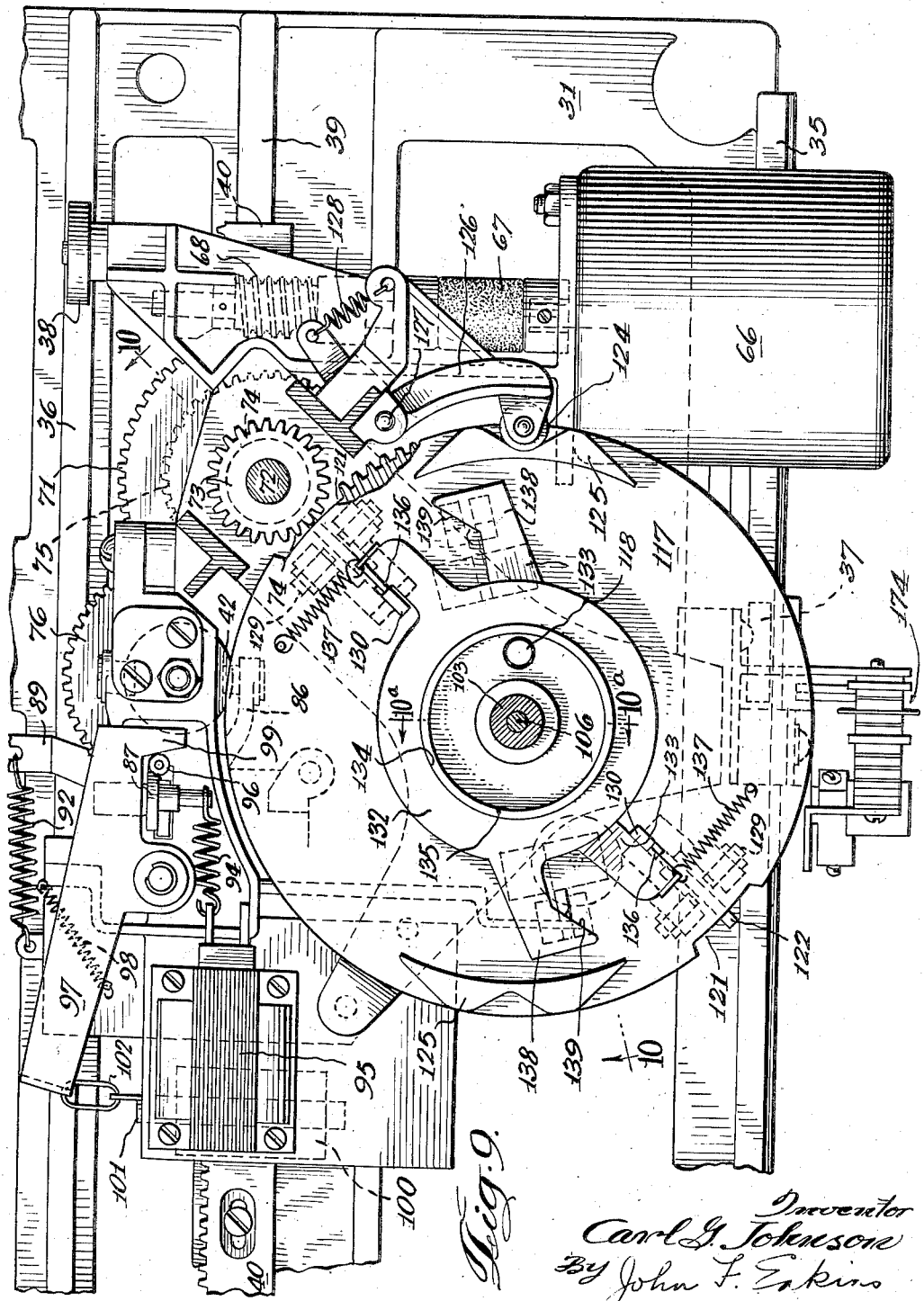

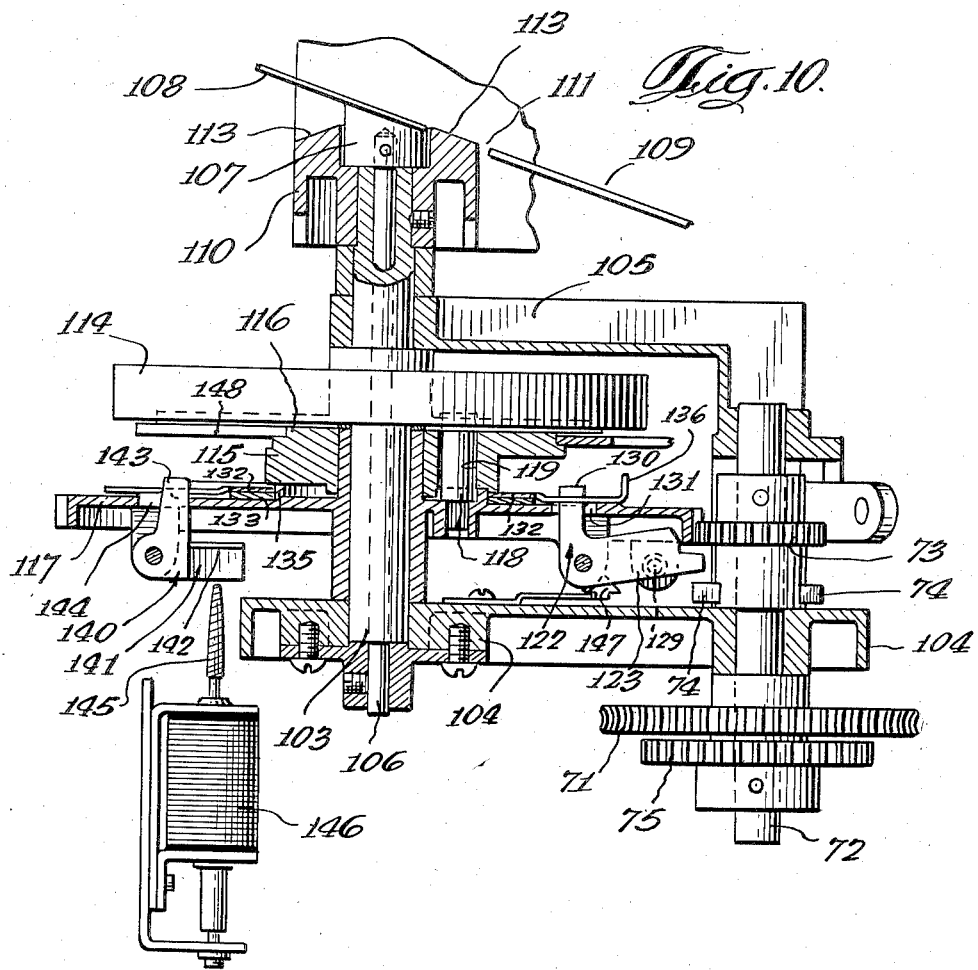

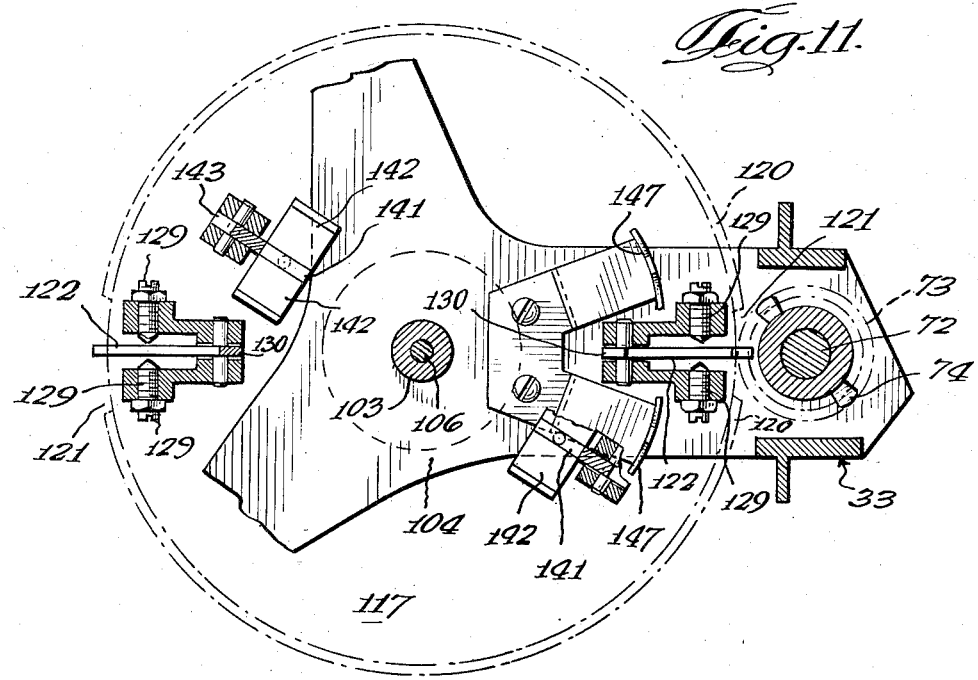
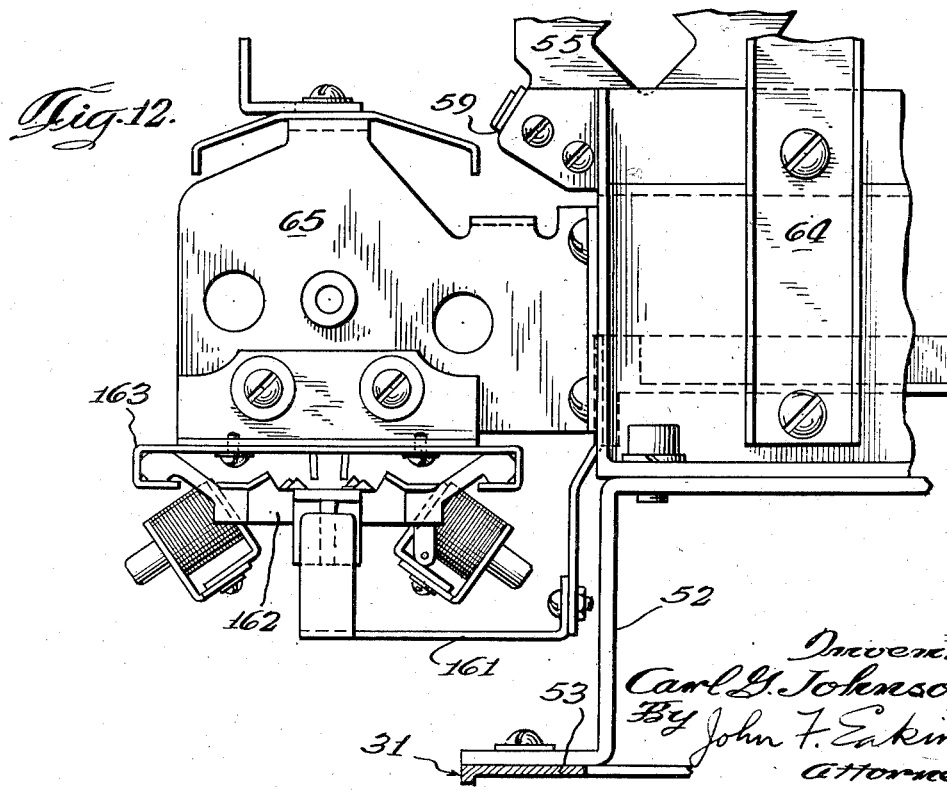

March 11, 1958 C. G. JOHNSON 2,826,418
RECORD HOLDING MECHANISM
Filed April 21, 1954 16 Sheets-Sheet 10
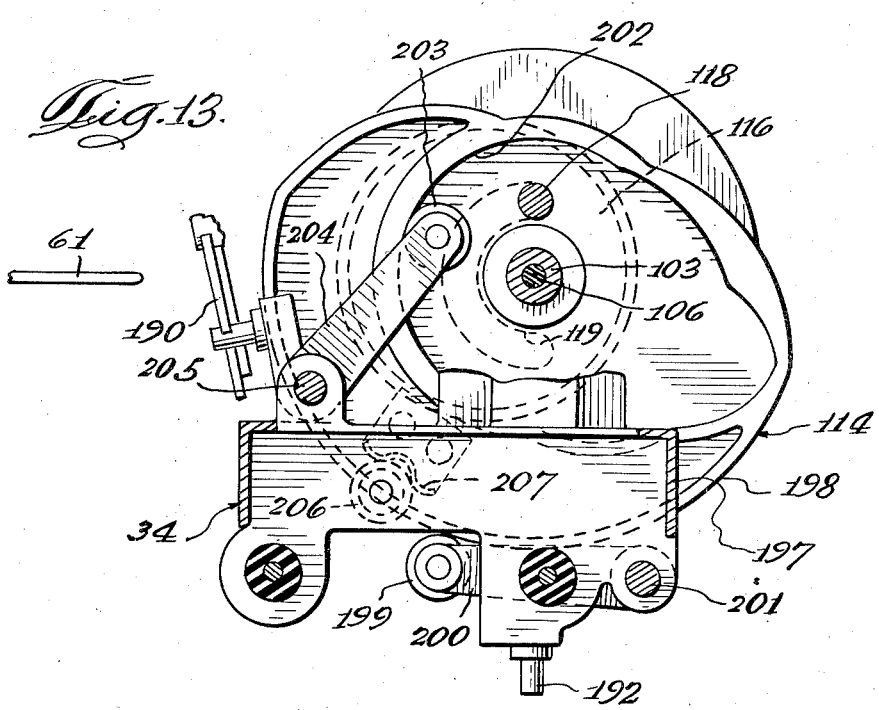
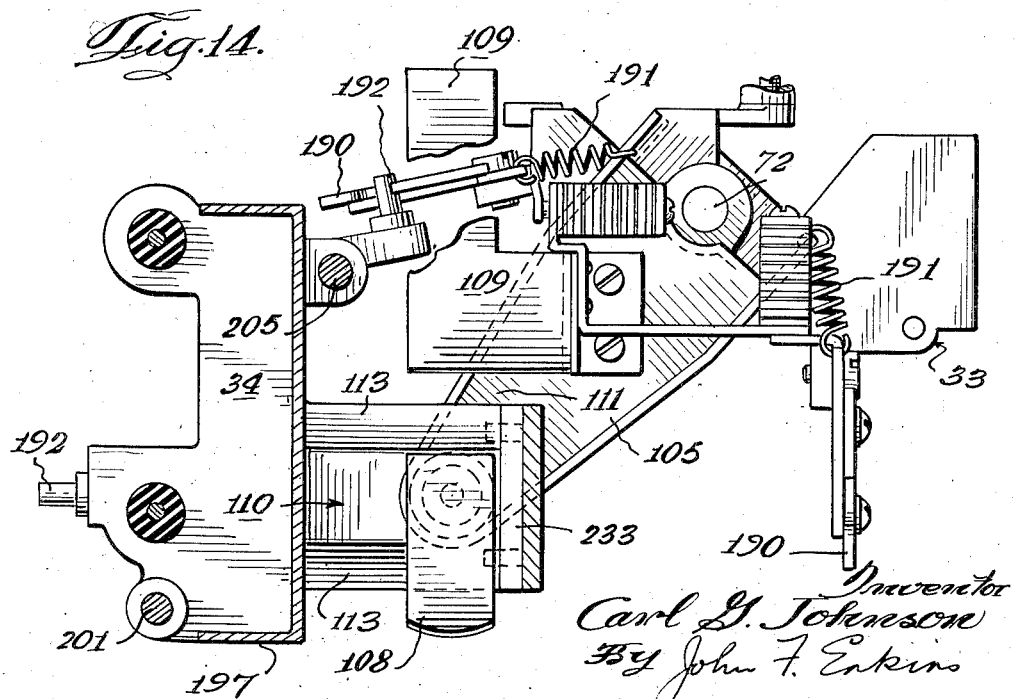
Inventor
Carl G. Johnson
By John F. Enkins
Attorney

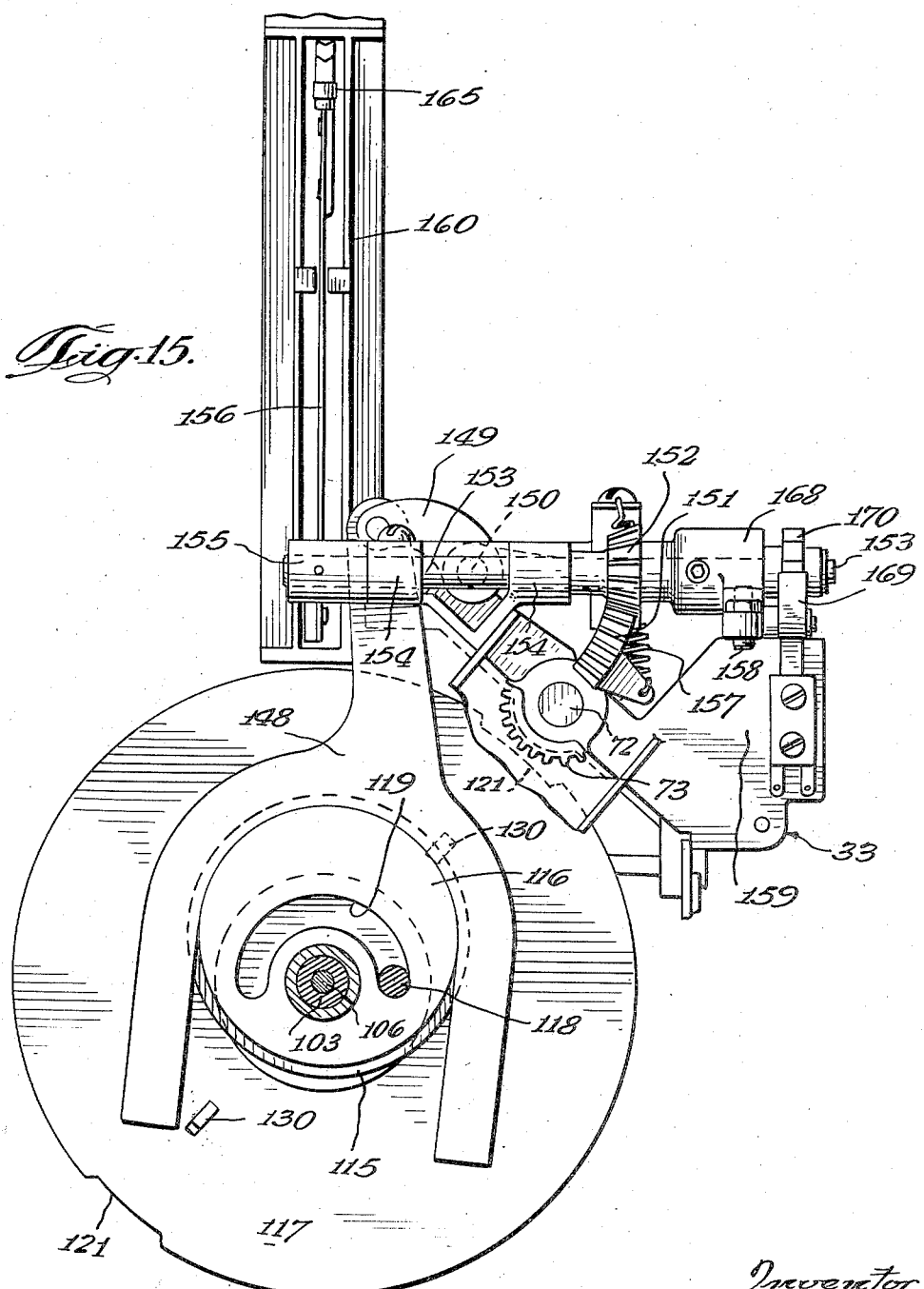

March 11, 1958 C. G. JOHNSON 2,826,418
RECORD HOLDING MECHANISM
Filed April 21, 1954 16 Sheets-Sheet 12
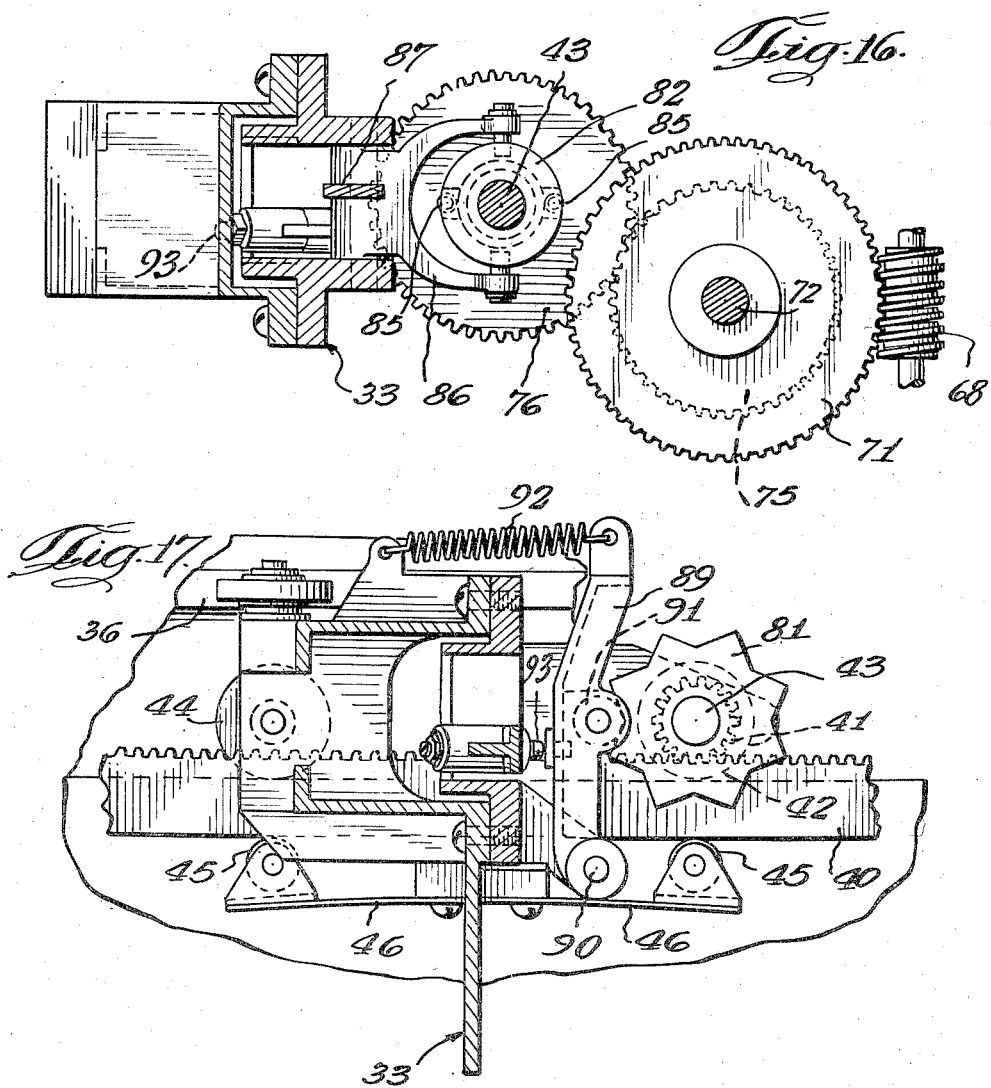

March 11, 1958 C. G. JOHNSON 2,826,418
RECORD HOLDING MECHANISM
Filed April 21, 1954 16 Sheets-Sheet 13
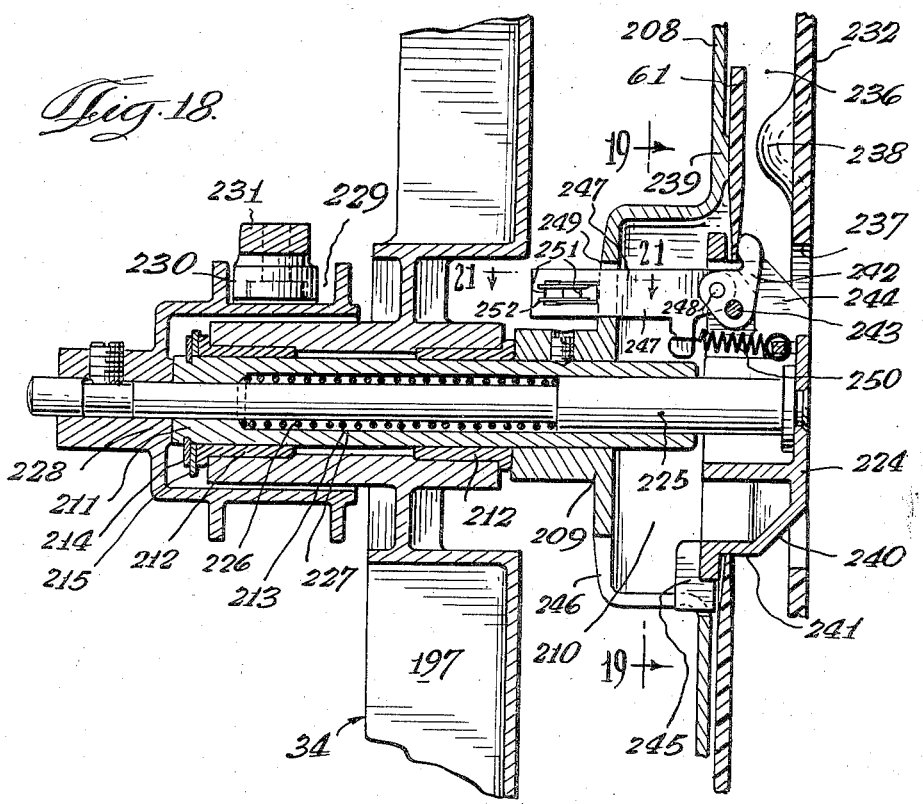
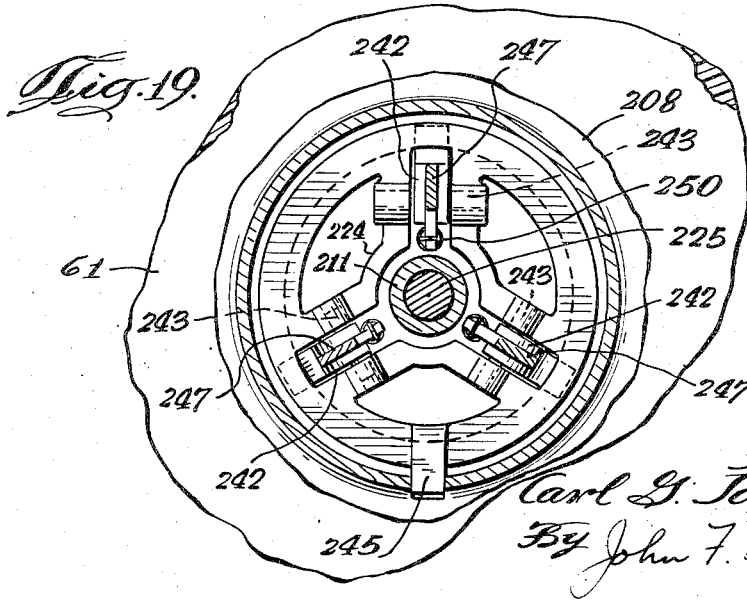
Inventor
Carl G. Johnson
By John F. Enkins
Attorney

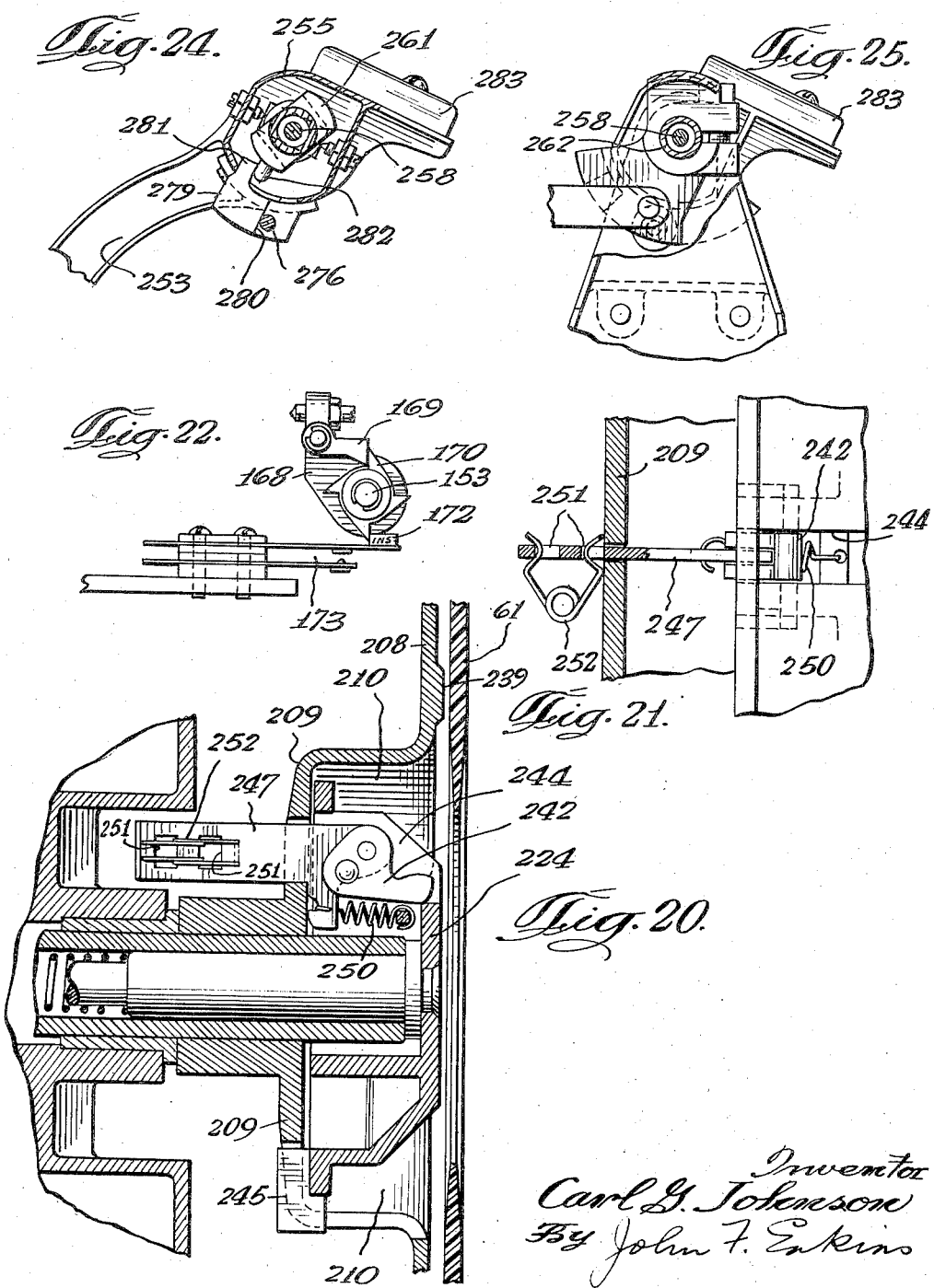

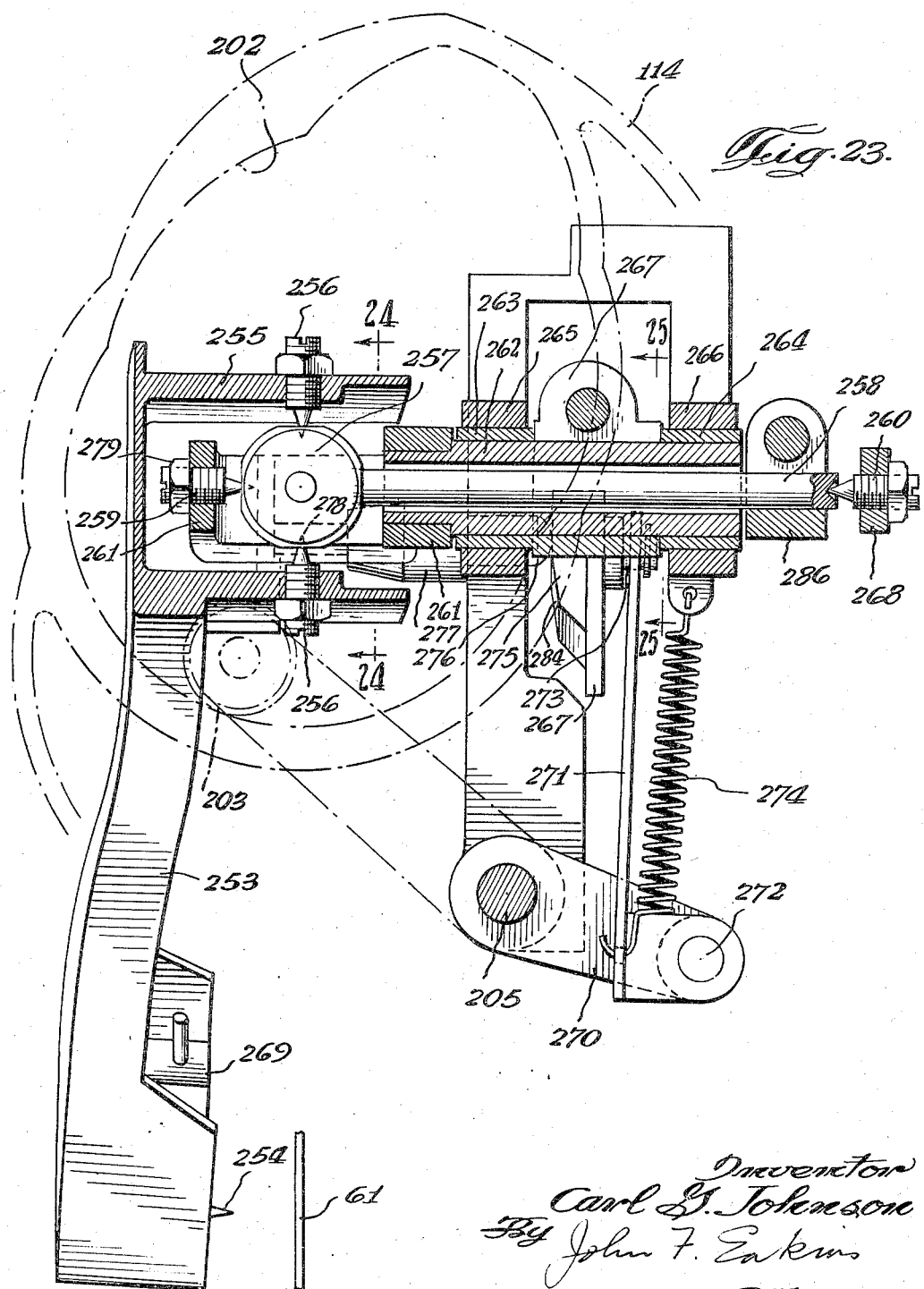

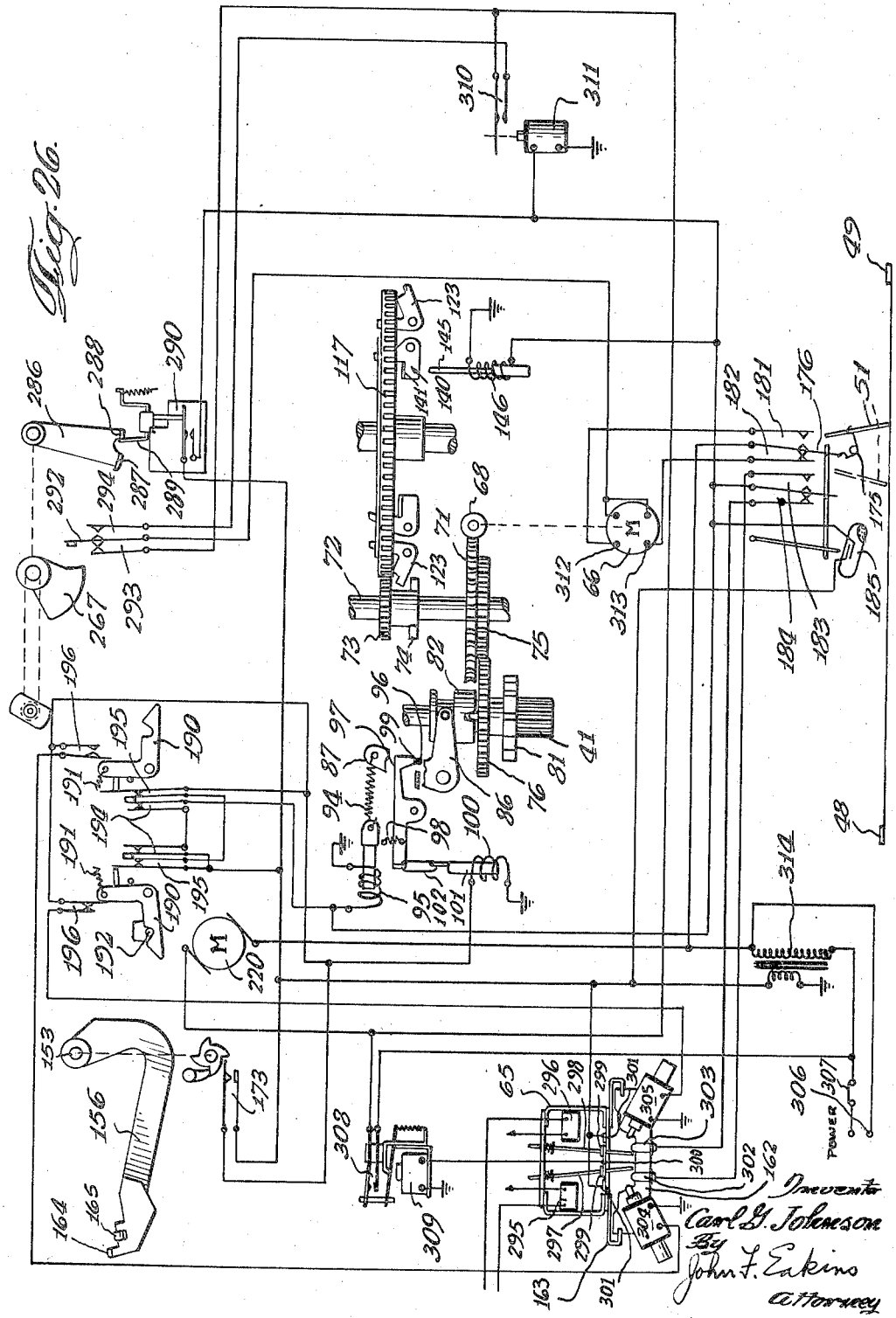

United States Patent Office 2,826,418

Patented Mar. 11, 1958

2,826,418

RECORD HOLDING MECHANISM

Carl G. Johnson, Chicago, Ill., assignor, by mesne assignments, to Fort Pitt Industries, Incorporated, Pittsburgh, Pa., a corporation of Pennsylvania Application April 21, 1954, Serial No. 424,554

5 Claims. (Cl. 274—39)

This invention relates to automatic phonographs and more particularly to such phonographs which are adapted to play either or both sides of a plurality of records.

The invention is particularly adapted for use in a phonograph in which the record is played in vertical position and in which the records are preferably stored in a magazine in vertical position.

In a known phonograph of this type the record is secured to rotating means which can be driven in one direction or the other and tone arm means are provided which cooperate with the appropriate side of the record.

According to the present invention, I provide a playing unit which is rotatable about an axis parallel to the planes of the records, into either of two positions spaced from each other by 180°. Consequently, when a record is supplied to the playing means, it will be rotated in one direction or in the other direction depending upon the position of the playing unit. Preferably the player arm is mounted on the playing unit so that it is always located to cooperate with the appropriate side of the record.

The magazine and the playing unit are relatively movable so that any record in the magazine may be located relative to the playing unit for transfer thereto and for return of the record to the magazine.

The present invention also provides improved means for securing the record to the playing unit and improved means for effecting tone arm manipulation.

The invention will readily be understood from the following description of a preferred embodiment thereof, taken in conjunction with the accompanying drawings, in which:

Fig. 3 is a similar view of the phonograph as viewed from the right side;

Fig. 4 is a fragmentary front elevation showing the switch structure;

Fig. 5 is a fragmentary sectional view taken on the line 5—5 of Fig. 4;

Fig. 6 is a fragmentary sectional view, the section being taken on the line 6—6 of Fig. 5 and the scale being enlarged;

Fig. 7 is a fragmentary sectional view, the section being taken on the line 7—7 of Fig. 1;

Fig. 8 is an elevational view of the lower part of the carriage as viewed on the line 8—8 of Fig. 2;

Fig. 9 is a sectional plan view taken on the line 9—9 of Fig. 1;

Fig. 10 is a fragmentary sectional view through the carriage and associated parts, the section being taken on the broken line 10—10 of Fig. 9; the upper extremity of Fig. 10 being shown in section taken on the line 10a—10a of Fig. 9;

Fig. 11 is a sectional plan view taken on the line 11—11 of Fig. 1;

Fig. 12 is a fragmentary elevational view showing the magazine and related parts on a larger scale;

Fig. 13 is a fragmentary sectional plan view taken on the broken line 13—13 of Fig. 1 showing the cam structure and associated parts;

Fig. 14 is a similar view taken on the line 14—14 of Fig. 3 showing the latch mechanism and associated parts;

Fig. 15 is a sectional plan view taken on the broken line 15—15 of Fig. 3 showing the transfer arm and actuating elements;

Fig. 16 is a sectional plan view taken on the line 16—16 of Fig. 8 showing drive and clutch elements;

Fig. 17 is a sectional plan view taken on the line 17—17 of Fig. 8 showing the detent mechanism and associated parts;

Fig. 18 is a sectional elevational view on a larger scale, the section being taken on the line 18—18 of Fig. 2 showing the turntable and record gripping elements;

Fig. 19 is a sectional detail taken on the line 19—19 of Fig. 18;

Fig. 20 is a fragmentary view similar to Fig. 18 showing the record released by the grippers;

Fig. 21 is a sectional plan detail, the section being taken on the line 21—21 of Fig. 18, the mechanism being shown on a larger scale;

Fig. 22 is an elevational detail showing a switch arranged to be closed each time the transfer arm has returned a record to the magazine as viewed on the line 22—22 of Fig. 8;

Fig. 23 is a sectional plan view taken on the line 23—23 of Fig. 1, showing on a much larger scale the mounting of the player arm and the mechanism associated therewith;

Fig. 24 is a sectional detail on a smaller scale taken on the line 24—24, showing the manner in which the player arm is moved to its outermost position;

Fig. 25 is a similar sectional detail taken on the line 25—25 of Fig. 23 showing the cam and associated parts which move the stylus away from the record and controls the application of the stylus to the record; and Fig. 26 is a wiring diagram.

Figure 1:
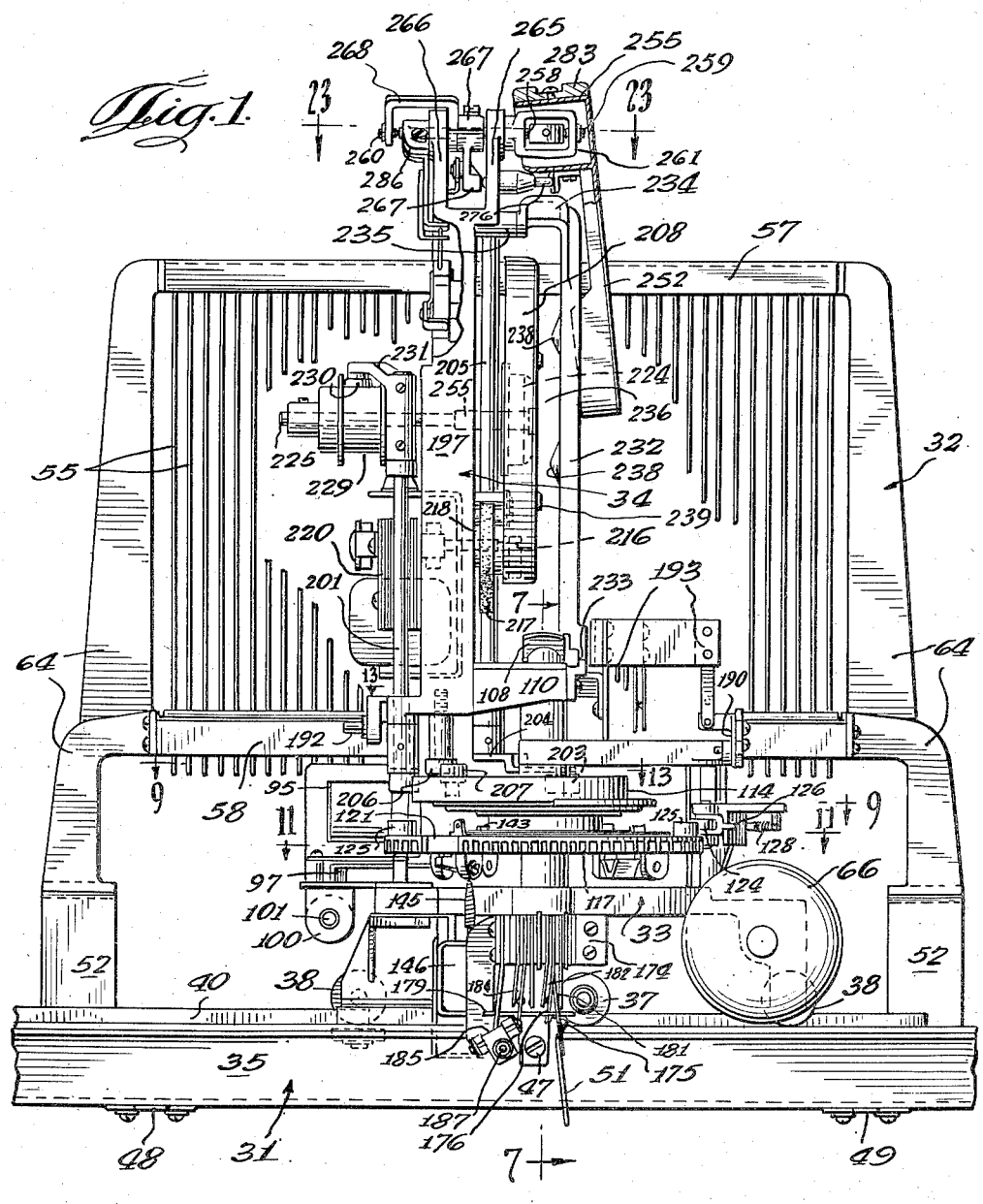
Figure 1 is a front elevational view of the phonograph.
Figure 2:
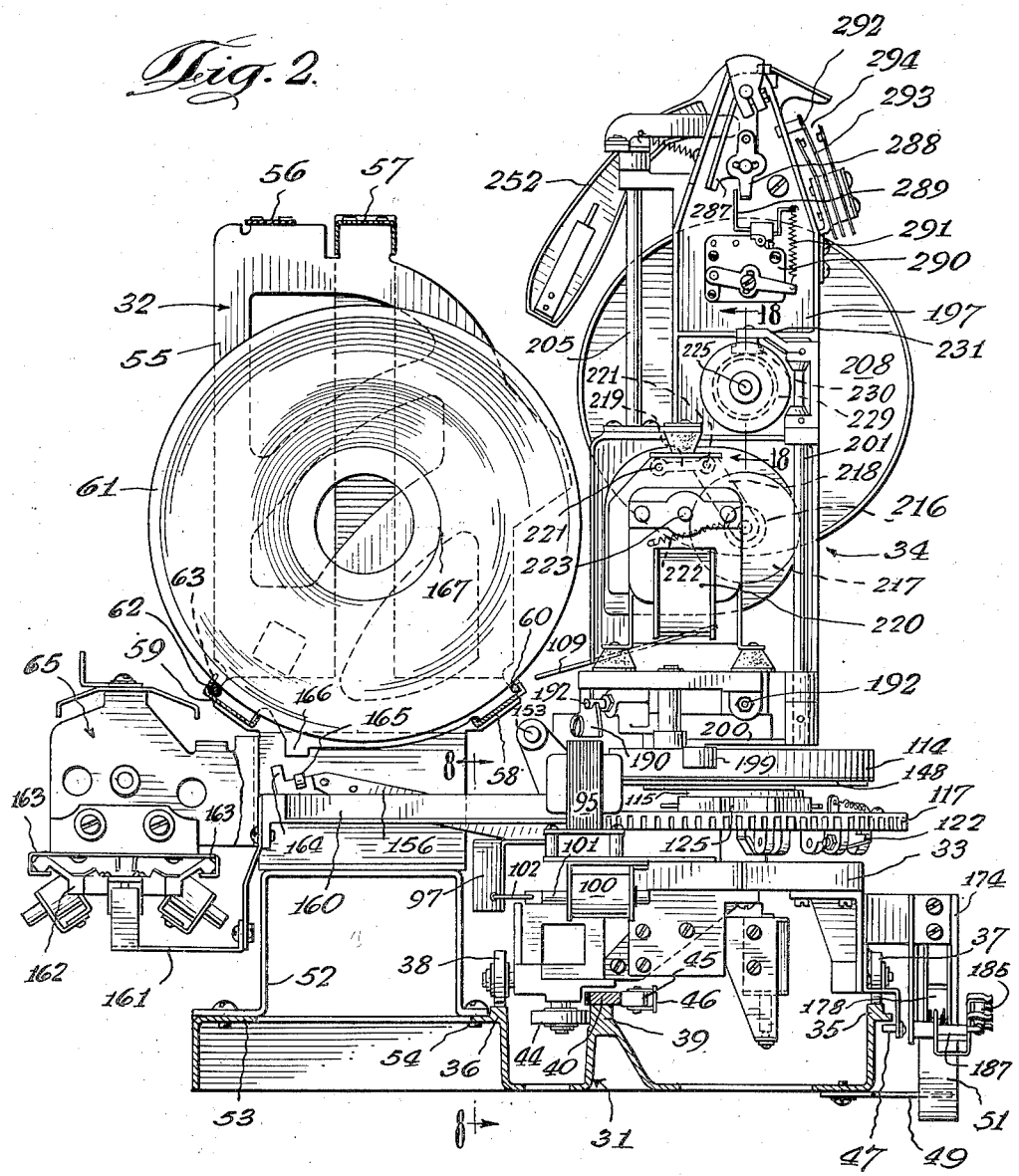
Fig. 2 is a sectional elevation of the phonograph as viewed from the left side.

Referring to the drawings and particularly to Figs. 1, 2 and 3, the improved phonograph comprises a base 31, a magazine 32 mounted on the base, a carriage 33 mounted on the base 31 for movement to and fro along the magazine and a playing unit 34 which is rotatably mounted on the carriage 33. The base 31 is preferably a casting which provides two rail portions 35 and 36 upon which run the wheels 37 and 38, these wheels being mounted on the carriage 33. It is to be noted that two wheels 38 are provided and one wheel 37 is located at approximately half way between the two wheels 38 so that the carriage is mounted on the base at three points. The rails 35 and 36 extend in parallel relation to the magazine so that the carriage may be located in operative relation with any of the record spaces of the magazine. Between the rails 35 and 36, the base 31 is provided with a parallel rail portion 39 to which is secured a rack 40. This rack is engaged by a pinion 41 (Fig. 7) rotatably mounted on the carriage 33. This pinion is driven in one direction or the other to effect to and fro movement of the carriage upon the rails 35 and 36. A roller 42, freely rotatable on the carriage on a vertical axis, and preferably on the shaft 43 which carries the pinion 41, is arranged to engage a machine surface on the rail formation 39. A similar roller 44 also mounted on the carriage on a vertical axis, also engages the same machine surface of the rail 39. A pair of rollers 45 carried by resilient members 46 which are secured to the carriage engage the front flat face of the rack 40. As best seen in Fig. 17, the rollers 45 are opposite the rollers 42 and 44 so as to locate the carriage properly with the pinion 41 in mesh with the rack 40 and the rollers 37 and 38 in proper relation with the rails 35 and 36. A pin 47 mounted on the carriage projects inwardly below the lip of the rail 35 (Fig. 2) and since the rack 30 projects rearwardly above the rollers 42 and 44, the carriage 33 is prevented from accidental movement from the base.

The base 31 is provided with two stops 48 and 49 which are arranged to cooperate with a switch actuating arm 51 which is mounted on the carriage 33.

The magazine 32 is mounted upon two bridge members 52 which extend between a rear rail portion 53 of the base and a lip 54 contiguous with the rail 36. The magazine comprises a series of vertical spacers 55, as best shown in Fig. 2. These spacers are regularly spaced from each other to provide individual pockets for the records. The spacers 55 are supported and maintained in position by means of a strap 56 and three channel members 57, 58 and 59, all of which are individually secured to each spacer. A resilient cord 60 is nested in the channel member 58, as best seen in Fig. 2, to provide the front edge support for the record 61. A similar resilient cord 62 is nested in the channel member 59 to provide the rear edge support of the record. The rear wall 63 of the channel 59 projects upwardly beyond the cord 62 and is provided with V-shaped recesses, one for each record space, so that the portion of the record adjacent the channel member 59 is centrally located within its record space. The channels 57, 58 and 59 are secured to terminal standard structures 64, each of which is secured to one of the bridge members 52, as best seen in Fig. 1. The selector 65, which will hereinafter be more fully described, is secured to the standard structures 64 so as to extend along and to the rear of the magazine, as best illustrated in Fig. 2.

The carriage 33 carries a reversible motor 66 which is connected through a flexible coupling 67 to a worm 68. This worm is rotatably mounted in brackets 69 and 70 integral with the carriage. The worm 68 meshes with a worm gear 71 which is rigidly carried by a vertical shaft 72 mounted in a bearing on the carriage 33. At its upper end the shaft 72 rigidly carries a pinion 73 which also carries several large teeth 74. Below the worm gear 71, the shaft 72 rigidly carries a pinion 75 which meshes with a pinion 76. The pinion 76 is mounted for free rotation on the vertical shaft 43 which is mounted on the carriage by an upper bearing 78 and a lower bearing 79 which is carried by a bracket 88 depending from the carriage. The shaft 43 rigidly carries a star wheel 81 and the pinion 41 which meshes with the rack 40. The roller 42 rests on the bracket 80 and is freely rotatable about the bearing 79. A clutch member 82 is slidably mounted on the shaft 43 (see also Fig. 7). This clutch member is provided with slots 83 which always engage pins 84 carried by the shaft 43 and which are arranged to engage upwardly directed pins 85 carried by the pinion 76. It will readily be understood that when the motor 66 is operating, the pinion 73 is always rotating in one direction or the other depending upon the direction of the motor, and that when the clutch member 82 is up, the pinion 76 turns idly. When, however, the clutch member 82 is down, the pinion 76 is clutched to the pinion 41 and the carriage is moved in one direction or the other depending upon the direction of rotation of the motor.

The clutch member 82 is actuated by a fork 86 which is carried by a lever 87 pivotally mounted on the carriage at 88. A lever 89 pivoted on the carriage at 90 carries a roller 91 and is arranged to cooperate with the star wheel 81 in the manner shown in Fig. 17. The arrangement is such that when the roller 91 is forced against the star wheel 81, it positions the star wheel and consequently the carriage is in accurate position to receive a record from the magazine. The recesses of the star wheel are spaced to correspond with consecutive record receiving positions. During playing and record manipulation, the lever 89 has its position of Fig. 17. When, however, the carriage is traveling, the roller 91 is moved away from the star wheel 81 by the spring 92. The lower end of the lever 87 carries an adjustable pin 93 which is arranged to engage the lever 89 to force the roller 91 against the star wheel 81. The upper end of the lever 87 is connected by a spring 94 to the armature of a solenoid 95. The upper end of the lever 87 also carries a roller 96 which is arranged to cooperate with a latch 97, best shown in Fig. 9. It will readily be understood from Fig. 8 that when the solenoid 95 is energized the lever 87 is rotated clockwise disengaging the clutch member 82 and forcing the roller 91 against the star wheel 81. The latch member 97 is biased in the clockwise direction, as viewed in Fig. 9, by a spring 98. The latch member 97 comprises a long sloping tooth 99 which engages the roller 96. It will readily be understood that when the solenoid 95 is energized and the lever 87 is moved clockwise, as viewed in Fig. 8, the tooth 99 under the influence of the spring 98 moves clockwise, as viewed in Fig. 9, so as to latch the lever 87 in actuated position with the clutch member 82 disengaged and the roller 91 forced against the star wheel 81. It is to be noted that this condition is obtained when the solenoid 95 is energized or when the latch member 97 is in latching position. The latch member 97 is moved to unlatching position by a solenoid 100, the left-hand end of the latch member, as viewed in Fig. 9, being connected to the armature 101 of this solenoid by means of a link 102.

Referring to Fig. 10, a vertical sleeve 103 is rotatably mounted on bearings provided by brackets 104 and 105 supported on the carriage. A rod 106 is rigidly secured to the bracket 104 and extends through the sleeve 103. At its upper end, a boss 107 is rigidly secured to the rod 106. This boss carries a small track element 108 which slopes downwardly towards the lower part of the magazine. Another track element 109 is secured to the carriage so as to be in alignment with the track element 108. The boss 107 extends into the recess of a member 110 upon which the playing unit is supported. Between the track elements 108 and 109 is provided a gap 111 to enable the fence 232 of the playing unit to pass from one side of the track to the other. When the playing unit is in either of its playing positions this gap is substantially filled by one or other of the sloping formations 113 on the member 110 so that a substantially complete track is provided upon which a record may roll during its transfer from the magazine to the playing unit or vice versa. A main cam member 114, a member 115 providing an eccentric 116 and a mutilated gear 117 are mounted for free rotation on and relative to the sleeve 103. A pin 118 rigidly secured to the mutilated gear 117 extends through a slot 119 in the member 115 and into an opening in the main cam member 114 causing the main cam member to turn in either direction with the mutilated gear 117. The slot 119 in the member 115 is arcuate, as best shown in Fig. 15, and extends slightly over 180° so as to provide a relative movement of 180° between the member 115 and the main cam member and mutilated gear. It will readily be understood from Fig. 15 that if the mutilated gear is subjected to consecutive half rotations in the clockwise direction, the pin 118 will carry the member 115 through similar half revolutions. If the mutilated gear 117 is rotated half a revolution in the counterclockwise direction, the member 115 will not move with it, the pin 118 merely moving through the slot 119 to the other end of the slot. Subsequent half revolutions of the mutilated gear 117 in the counterclockwise direction will cause the member 115 to perform similar half revolutions. It may here be noted that the element 115 controls the actuation of the transfer arm, and that when the direction of successive steps of the mutilated gear 117 is reversed to effect a half revolution of the player unit, the transfer arm remains ineffective. The pin 118 is, however, conditioned to resume operation of the transfer arm when the mutilated gear is stepped in the new direction. The mutilated gear 117 is provided with two series of teeth 120 which are arranged to mesh with the pinion 73. Diametrically opposite gaps 121 are provided between the two series of teeth and when these gaps are aligned with the pinion 73 the mutilated gear is not driven. A pair of dogs 122 are pivotally mounted on the underside of the mutilated gear so that their horizontal portions 123 project radially outward in the center of the gaps 121. Normally, each dog 122 is latched in the position shown in Fig. 10 but when it is released, the outer extremity of its horizontal portion drops into alignment with the large teeth 74. One of these large teeth engages the dog 122 and moves the mutilated gear so as to bring one set of its teeth 120 into mesh with the pinion 73, thus starting one revolution of the cam gear 117 in a direction determined by the direction of the motor. The drive of the mutilated gear terminates when the other gap 121 comes opposite the pinion 73, the final and accurate position of the cam gear 117 being effected by a roller 124 which engages a large V-shaped opening in one or other of the blocks 125 carried by the mutilated gear 117. The roller 124 is carried by a lever 126 which is pivotally mounted on the carriage at 127 (Fig. 9). A spring 128 secured to the carriage and to one end of the lever 126 biases the roller 124 into the V-shaped recess in the block 125. Since the dogs 122 must cooperate with the large teeth 74 when they are operating in one direction or the other, I prefer to mount these dogs quite loosely and to provide adjustable means so as to insure correct meshing of the teeth 120 with the pinion 73. As shown in Fig. 11, I prefer to provide two adjustable stops 129, preferably set screws, against which the dogs 122 abut when contacted by the large teeth 74. It will readily be understood that by adjustment of the set screws 129, correct meshing is attained in both directions of operation. Each dog 122 comprises a generally vertical arm 130 which projects upwardly through a slot 131 in the cam gear 117 (Fig. 10). Two latch elements 132 and 133 are provoded one for each dog 122. These latch elements are of flat stock, the element 132 overlying the element 133. They are provided with large openings 134 (Fig. 9) which engage an annular formation 135 on the upper side of the mutilated gear 117 so that they may rotate slightly on the gear. Each latch member 132 and 133 is provided with a detent formation 136 which is arranged to engage the vertical portion 130 of one of the dogs 122. The latching members are biased in the counterclockwise direction, as viewed in Fig. 9, by light springs 137 to maintain the latching engagement. When thus latched the dog 122 has its position shown in Fig. 10, that is, its inoperative position. At a suitable and similar position, not diametrically opposite the detent 136, each latching member 132 and 133 is provided with a projection 138 which includes an inclined surface 139. On the underside of the mutilated gear are pivotally mounted two dogs 140, each comprising a horizontal member 141 carrying a horizontal plate 142 and a generally vertical portion 143 which projects upwardly through a radial slot 144 in the mutilated gear. When the detent 136 of the latch member 132 is latching the associated dog 122 opposite the pinion 73, as shown in Fig. 9, the plate 142 of the dog 140 associated with the latch member 132 is in alignment with the plunger 145 carried by the solenoid 146 (Figs. 9 and 10). When this solenoid is energized the plunger 145 swings the associated dog 140 in the counterclockwise direction, as viewed in Fig. 10, with the result that the arm 143 is moved radially outwardly cooperating with the sloping surface 139 so as to cause the latching member 132 to rotate slightly in the clockwise directon, as viewed in Fig. 9, thus releasing the dog 130 enabling it to initiate half revolution drive of the mutilated gear 117. At the end of this half revolution the other dog which is controlled by the latching member 133 will be adjacent the pinion 73 and its associated dog 140 will be in cooperative relation with the plunger 145 and the solenoid 146. Two cam members 147 carried by the bracket 104 are located so that one or other of them is engaged by the effective latch 122 after it has moved away from the large teeth 74 so as to swing the dog in the counterclockwise direction, as viewed in Fig. 10, whereupon it is immediately latched up by its associated latch member under the influence of one of the springs 137. It will thus appear that each time the solenoid 146 is energized the mutilated gear 117 will perform half a revolution in one direction or the other depending upon the rotation of the motor, and that when the half revolution is performed, the mutilated gear 117 remains stationary until the solenoid 146 is again energized.

The eccentric 116 is engaged by a follower 148, as best shown in Fig. 15. This follower is pivotally connected to a lever 149 which is pivotally mounted on the carriage on a vertical axis 150. A sector 151 is carried by the lever 149 and is arranged to mesh with a pinion 152. The pinion 152 is rigidly carried by a horizontal shaft 153 which is mounted for rotation by means of bearings 154 carried by the carriage. On one end of the shaft 153 is rigidly secured the boss 155 of the transfer arm 156. The sector 151 and lever 149 are biased in the counterclockwise direction, as viewed in Fig. 15, by means of a spring 157. This spring forces the U-shaped member 148 against the eccentric 116. When the elements are in the position shown in Fig. 15 the transfer arm 156 is in its lowest position. As the mutilated gear 117 moves through half a rotation in the clockwise direction, the spring 157 causes the element 148 to follow the eccentric and to lift the transfer arm upwardly into record delivering position. The final upward position of the transfer arm 156 is controlled by an adjustable screw 158 which is arranged to abut a surface 159 on the carriage. Subsequent half rotations of the mutilated gear 117 in the same clockwise direction cause downward and upward movements of the transfer arm 156. If the direction of the motor is reversed the first half revolution of the mutilated gear 117 in the counterclockwise direction carries the playing unit through 180° but does not actuate the eccentric 116 or any of the elements associated therewith. The pin 118 merely moves around to the left-hand side of the slot 119, as viewed in Fig. 15. However, the next and subsequent half rotations of the mutilated gear 117 in the counterclockwise direction will result in upward and downward movements of the transfer arm 156.

During travel of the carriage the transfer arm 156 is located in its lowermost position below the record 61 and the spacers 55 and it is preferably housed substantially within a boxed like bracket 160 which is mounted on the carriage and projects rearwardly beneath the magazine. This bracket 160 has secured thereto a bracket 161 which is secured to a slider 162, this slider being mounted in suitable guides 163 on the selector 65, as best seen in Fig. 2. The main portion of the transfer arm 156 is somewhat resilient. At its rearmost end the arm 156 carries a record engaging fork 164 and also a roller 165. When the arm 156 moves upwardly the roller 165 enters between downward projections 166 provided on the spacers 55, before the fork 164 engages a record 62. The roller 165 is only slightly less than the distance between spacers so that the fork 164 is properly aligned with part of the record which the fork engages. As this part of the record is quite close to the V-shaped formations 63 which insure the correct centering of the record at that part. It is to be noted that the spacers are conformed so as to provide a track portion 167 along which the roller 165 may roll during the movements of the transfer arm 156. The bracket 168 which is mounted on the shaft 153 and carries the pin 158 has pivoted thereto a dog 169 (see Figs. 8, 15 and 22). The dog 169 is biased by a spring 170 (Fig. 8), towards a star wheel 171 which is mounted for free rotation on the shaft 153. As best shown in Fig. 22, each tooth of the star wheel 170 has a substantial radial side which may cooperate with the dog 169 or the block insulation 172. When the transfer arm is in its lowermost position the bracket 168 is in the position shown in Fig. 22. During transfer of the record from the magazine to the playing unit the bracket 168 moves in counterclockwise direction, as viewed in Fig. 22, and the dog 169 slides past the tooth of the star wheel 170 which is directed towards the left. The star wheel 170 does not rotate in the counterclockwise direction because of the engagement of the lowermost tooth with the block 172. During the return of the record to the magazine the bracket 168 moves into its position shown in Fig. 22 and the dog 169 carries the star wheel 170 through one-quarter of a revolution. This causes the tooth of the star wheel 170 which is directed towards the right, to engage the upper surface of the block 172 and to depress it. The block 172 is carried by a flexible arm of a switch 173 so that this switch is closed momentarily when the record is back in the magazine and the transfer arm 156 has cleared the spacers and records in the magazine.

The switch actuating arm 51, previously referred to, is mounted in a block 174 and is connected by an over center spring 175 to a switch pole 176 also mounted in the block 174. The block 174 is secured to the carriage. The pole 176 is connected to another switch pole 177 and to another actuating flat spring 178 by a strip of insulation 179. It may be noted that the upper part 180 of the actuating arm is slotted, as best seen in Fig. 5, so that this arm does not foul the strip 179 or any of the switch elements. The switch arms 176 and 177 cooperate with other contacts also mounted on the block 174 to provide switches 181, 182, 183 and 184. When the actuating arm 51 is thrown into its position, shown in Fig. 4, the switches 181 and 183 are open and the switches 182 and 184 are closed. The actuating arm 51 is thrown into this position at the end of the movement of the carriage towards the left, as viewed in Fig. 1, by engagement of the arm 51 with the left-hand stop 48 and conditions the circuits to cause movement of the carriage towards the right. When the arm 51 engages the right-hand stop 49, the switch arm 51 is thrown to the left, as viewed in Fig. 1, opening the switches 182 and 184 and closing the switches 181 and 183. As will hereinafter be more fully described, this causes reversal of the motor 66 so that the carriage is now driven towards the left. The actuating arm 178 effects the temporary closing of a switch 185 which may suitably be a mercury switch mounted in a frame 186 which is pivotally mounted on a pin 187. The pin 187 is supported on a bracket 188 depending from the carriage 33. The lower end of the actuating arm 178 extends into a slot 189, as best seen in Fig. 6. The switch 185 is arranged to provide a pulse of sufficient duration to insure actuation of the solenoids to which it is connected. For this purpose, I prefer to use a mercury switch with a relatively small angle, to employ a substantial body of mercury and to extend the electrodes in parallel spaced relation, as best shown in Fig. 26. It will readily be understood that when the arm 51 is thrown from either position to the other the inclination of the switch 185 is reversed and the two electrodes are electrically connected by the body of mercury moving down the new incline. At two suitable positions on the carriage, I pivotally mount two stop latches 190 which are biased to upward positions by springs 191. These stop latches cooperate each with one of two pins 192 mounted on the playing unit. When the playing unit is in one of its playing positions, one of the pins is seated within a recess in the latch 190. When the playing unit is rotated through 180° into its other playing position, the other pin 192 is seated within the recess of the other stop latch 190. The recesses in the stop latches 190 are conformed to serve as stops preventing further movement of the playing unit in the direction which brought the effective pin 192 into the recess of the associated stop latch 190. When a pin is thus seated in one of the stop latches, that stop latch is maintained in a position lower than when the stop latch is not engaged by a pin 192. The stop latches 190 and the pins 192 are relatively located so as to provide the playing unit with 180° freedom of movement from one playing position to the other. Each of the latches 190 is associated with a bank of switches 193. Each bank provides switches 194, 195 and 196. As best seen in Figs. 3 and 26, when a stop latch 190 is disengaged by its pin 192 the associated switch 196 is open and the associated switches 194 and 195 are closed. When the latch is moved to a lower position by engagement with its pin 192 the associated switch 196 is closed and the associated switches 195 and 194 are open. When both stop latches 190 are disengaged, which occurs when the player unit is moving from one playing position to another, both switches 196 are open and both switches 194 and both switches 195 are closed. Fig. 13 shows the main cam 114 and the main frame 197 in position for the transfer of a record 61 from the magazine. The motor 66 is being driven so as to drive the cam gear in the clockwise direction. It may here be noted that after the playing of the record and the resumption of the scanning movement of the carriage the movement of the carriage will be towards the right as viewed from the front of the magazine, that is, as viewed from the right of this figure. The main cam 114 provides an exterior cam 198 which cooperates with a roller 199. The roller 199 is carried by an arm 200 which is rigidly secured to a shaft 201 on the playing unit. The main cam member 114 also provides an interior cam 202 which is engaged by a roller 203 carried by an arm 204 which is mounted on a vertical shaft 205 on the player unit. The pin 118 being located in the upper end of the slot 119, rotation of the mutilated gear 117 in the clockwise direction, as viewed from above, will cause simultaneous movements of the eccentric 116 and the main cam 114 in the same direction. Rotation of the eccentric 116 moves the record transfer arm upwardly while the rollers 119 and 203 travel on circular portions of their cams 198 and 202 respectively. After the record has been moved up the arm 200 swings in the clockwise direction and the arm 204 in the counterclockwise direction effecting gripping of the record in playing position and the application of the player arm to the record as will hereinafter be more fully described. After the main cam 114 has rotated half a revolution its drive is terminated only after the record is played. The mutilated gear is then rotated another half revolution in the same direction during which the arm 200 is swung in the counterclockwise direction to disengage the record, the arm 204 is moved in the clockwise direction to move the player arm away from the record and swing it outwardly beyond record playing position and finally the record transfer arm 156 controlled by the eccentric 116 is moved downwardly to return the record to the magazine. The main cam 114 is again arrested in its position of Fig. 13. It is to be noted that in this position a roller 206 carried by the player unit is frictionally engaged by a spring clip 207 on the main cam 114. During the movements of the main cam 114 just described, that is, the movements for transferring a record from the magazine and back again the player unit and the roller 206 remain in their positions because the engagement of one of the pins 192 with its latch 190 prevents clockwise movement of the playing unit. When the mutilated gear 117 is given a half revolution in the clockwise direction the clip 207 carries the roller 206 and consequently the playing unit in the clockwise direction through half a revolution bringing the other pin 192 into latched relation with the other stop latch 190. This stop latch prevents further movement of the playing unit and when the mutilated gear is given another half revolution in the counterclockwise direction the clip 207 disengages the roller 206 and returns into engagement therewith only after the next half revolution at which time the played record is again returned to the magazine. It is to be noted that during the first reversed rotation of the cam gear the transfer arm is not actuated, the pin 118 merely rides in the slot 119, the eccentric 116 remaining stationary. Further, during this first reversed half rotation in the counterclockwise direction, the main cam 114, the player unit and the rollers 199 and 203 move in unison so that there is no actuation of the shafts 201 and 205. It is to be noted that the cams 198 and 202 are effectively symmetrical so that the same movements are imparted to the transfer arm and the shafts 201 and 205 as have been described in connection with the consecutive movements in the clockwise direction previously described. It is to be noted that after the first half revolution in the reverse direction the playing unit is rotated through 180° so that it is now conditioned to play the left-hand sides of records as viewed from the front of the machine. Owing to the reversal of the motor the carriage will scan to the left when such scanning is resumed.

The playing unit comprises the main frame member 197 which is secured to one side of the member 110 carried by the sleeve 103 (Figs. 1 and 10). This main frame member supports the roller 206 which engages the clip 207 and provides bearings for the shafts 201 and 205 (Fig. 2). A rotatable record supporting member 208 is mounted on the frame member 197 for rotation about a horizontal axis. This member comprises essentially a flanged disc having a centrally depressed hub 209 which provides a central space 210 for a purpose hereinafter to be described. The hub 209 is rigidly secured to a sleeve 211 which is rotatably mounted in bearings 212 in a horizontal bore 213 provided by the main frame member 197, as best seen in Fig. 18. The sleeve 211 is held against displacement by engagement of the hub with one bearing 212 and by a C-washer 214 and a washer 215 which engage the other bearing 212. The record supporting member 208 is driven by a rubber wheel 216 which engages its inner flange. The wheel 216 is integral with a larger rubber wheel 217 and both are mounted for rotation on a link 218 (see Figs. 1 and 2). The upper end of the link is pivotally secured to another link 219 which is pivoted to a stationary part of the motor 220 at 221. A spring 222 secured to the link 218 and to the frame of the motor draws the lower end of the link so as to make contact between the wheel 216 and the flange of the support 208 and between the wheel 217 and the spindle 223 of the motor 220. The motor 220 drives in one direction and through the friction wheels 217 and 216 it drives the support member 208 in a single direction for the playing of a record. A record centering head 224 is mounted on a spindle 225 which extends slidably through the sleeve 211. Both the spindle 225 and the sleeve 211 are correspondingly stepped, as shown in Figs. 18 and 20, providing an annular space 226 in which is received a coil spring 227 which is under compression and tends to move the head 224 outwardly beyond the record support 208, as shown in Fig. 18. This outward movement of the head is limited by an element 228 rigidly secured to the spindle 225, as shown in Fig. 18. The element 211 carries an annular track 229 in which is located a roller 230. This roller is rotatably mounted on an arm 231 carried to the upper end of the shaft 201. When the roller 199 is riding on the high surface of its cam 198 the roller 230 is in its outermost position, that is, furthest away from the record support 208 and the head 224 is moved against the compression of the spring 213 into the recess 210 in the record support 208 as is shown in Figs. 1 and 20. When the fall of the cam 198 moves past the roller 199 and after a record has been moved up the track 109, 113 and 108 by the transfer arm 156, the spring 213 is permitted to move the spindle 225 to the right, as viewed in Figs. 18 and 20, projecting the head 224 through the central opening of the record, as shown in Fig. 18 and as further described in detail. When the main cam 114 is in stationary position during the playing of a record the roller 230 is free and applies no pressure to the element 228. During the next half revolution of the main cam 114 the roller 230 is moved outwardly effecting release of the played record and withdrawal of the head 224 into the central recess 210 of the record support 208.

I provide a record fence 232 in spaced relation to the outer surface of the record supporting member 208, as best seen in Fig. 1. This fence is secured to the other side of the member 110 and is formed at its lower end, as best shown in Fig. 1, to provide a narrow portion 233 which is able to pass through the gap 111 between the two track elements 108 and 109 (Figs. 3 and 10). It is to be noted that when the player unit is moved from one playing position to the other the main portion of the playing unit including the frame 197 always swings to the front, that is, away from the magazine and thus passes clear of the upper end of the stationary track element 108. The fence 232 may suitably be formed of plastic material. Its upper end is secured to an arcuate channel member 234 which is arranged to clear the record in playing position, as best shown in Fig. 3. The channel member 234 is secured to suitable bosses 235 on the main frame 197 of the player unit, as best seen in Fig. 1. As best seen in Fig. 3, the distance between the forward end of the track element 108 and the forward end of the channel member 234 is somewhat smaller than the diameter of the record 61 so that the record cannot be thrown substantially past the record playing position in the event that the transfer arm 156 is arrested momentarily and then becomes released. The main body of the fence 232 is spaced from the record supporting member 208, as best seen in Figs. 1 and 18, to provide a record receiving space 236 which is above and in alignment with the track elements 109, 113 and 108. The record being supplied to the playing unit is delivered by the transfer arm into this space while maintained in vertical alignment therewith by the associated magazine spacers 55. The fence 232 is provided with a central opening 237 into which the outer portion of the head 224 projects when a record is being secured to the record support 208, as best seen in Fig. 18. The fence 232 is provided with conical abutments 238, preferably three in number, which project into the record space 236. The record support 208 is provided with abutments 239, preferably three in number, against which the record 61 abuts when secured in playing position, as best seen in Fig. 18. The abutments 239 are of frusto-conical shape so that a record being moved by the transfer arm 156 substantially into alignment with the record support 208 is guided into the narrow space between the abutments 238 on the one side and 239 on the other side. The stop pin 158 (Fig. 15) which serves as a stop for the upward movement of the transfer arm 156 is adjusted so that this arm is arrested when the record being transferred is supported on the track element 108 with its axis slightly below and slightly rearward from the axis of the head 224. The head 224 is provided adjacent its outer face with a frusto-conical formation 240. When the head is projected from its position of Fig. 20 into its position of Fig. 18, the frusto-conical formation 240 enters the central opening of the record 61 and owing to the engagement of the record with the projections 238 of the fence 232, the record is cammed upwardly and forwardly clear of the track element 108 and clear of the transfer arm 156. The opening of the record to be played is received on the cylindrical portion 241 of the head 224 which is contiguous with the portion 240.

The record is secured to the record support 208 by dogs 242 in the manner shown in Fig. 18. These dogs are preferably three in number and are arranged in radial alignment with the projections 239. These dogs are pivotally mounted at 243 on the head 224 and operate in radial slots 244 provided in the head 224. A projection 245 on the head 224 rides in a slot 246 in the hub 209 of the record support 208 so that the head 224 and the elements connected thereto rotate with the record support 208. A strip 247 is pivotally connected at 248 to each dog 242. This strip extends inwardly through a slot 249 in the hub 209 of the record support 208. Each strip 247 is biased outwardly by a spring 250 secured to the strip and to the interior of the head 224. When the head 224 is retracted into the recess 210 in the hub 209 of the record support 208, as best seen in Fig. 20, the springs 250 cause the strips 247 to move outwardly relative to the head 224 causing the dogs 242 to be completely withdrawn into their slots 244. The inner end of each strip is provided with openings 251 (Figs. 20 and 21) in which I mount a spring 252 which are arranged to engage the base of the hub 209 of the record support 208. When the head 224 is retracted into the opening 210, as shown in Fig. 20, the springs 252 are spaced away from the hub 209 so that the springs 250 are free to maintain the strips 247 in an outward position relative to the head 224, thus withdrawing the dogs 242 completely within their slots 244. When the head 224 is moved outwardly so as to lift the record onto its cylindrical portion 241, as shown in Fig. 18, the strips 247 and the dogs 242 maintain their relation shown in Fig. 20. In the final outward movement of the head 224 the springs 252 engage the base of the hub 209 thus arresting the outward movement of the strips 247. Since the pivots 248 are thus arrested and the pivots 243 continue their outward movement the dogs 242 are swung outwardly so as to clamp the record 61 to the projections 239 of the record support 208, as shown in Fig. 18. When the head 224 is moved inwardly again the pivots 248 are maintained substantially stationary and the pivots 243 moving inwardly each dog 242 swings into its slot 244 and continued inward movement of the head 224 then carries the elements into their position in Fig. 20. The played record 61 is thus released to reengage the fork of the transfer arm 156 and the track element 108 and the downward movement of the transfer arm 156 permits the played record to return to its space in the magazine.

The player arm 253 (Fig. 23) which is provided with a stylus 254 carries a hub 255. This hub is provided with adjustable points 256 which provide an axis for the player arm on which to move towards and away from the record 61. The points 256 connect the player arm to a block 257 which is rigidly secured to a shaft 258. The block 257 and the shaft 258 are mounted for rotation on a horizontal axis by means of adjustable points 259 and 260. The point 259 is mounted in a yoke 261 which is mounted on a sleeve 262 rotatable on a horizontal axis in bearings 263 and 264 on elements 265 and 266 on the main frame 197 of the player unit (see also Fig. 1). Between the bearings 263 and 264 a member 267 which maintains the sleeve 262 against axial movement. A bracket 268 (see also Fig. 1) extends from the member 267 around the element 266 so as to provide a support for the point 260. It is to be noted that the shaft 258 extends freely through the sleeve 262. The points 259 and 260 provide a horizontal axis about which the player arm 253 may move in its movements over the face of the record. As best seen in Fig. 3, the axis provided by the points 256 for the tone arm is preferably substantially at right angles to the axis of the pickup 269 which carries the stylus 254.

The vertical shaft 205 which carries the arm 204 and roller 203 which cooperate with the inside cam 202 is mounted on suitable bearings on the frame 197. At its upper end, a radial arm 270 is secured to the shaft 205. A link 271 is pivotally connected to the arm 270 at 272 and to a pin 273 carried by the member 267. A spring 274 (Fig. 23) connected to the link 271 and the frame member 264 tends to swing the arms 270 and 204 in the counterclockwise direction, as viewed in Figs. 23 and 13, thus causing the roller 203 to be forced towards its cam 202. The lower portion of the member 267 carries a cam 275, engages a plunger 276 which is supported in a barrel 277 carried by the frame member 265. The plunger 276 is biased towards the right and towards the cam 275 by spring means (not shown). The outer reduced end 278 of the plunger 276 is arranged to cooperate with a stepped arcuate flange 279, the step being indicated by the reference numeral 280 (see also Fig. 24). The arcuate flange 279 is secured to the outer side of the hub 255 of the player arm 253. An abutment 281, preferably integral with the flange 279, projects through a suitable slot into the hub 255 of the player arm 253, as best seen in Fig. 24. This projection is arranged to cooperate with a projection 282 carried by the yoke 261. It may here be noted that when the plunger 276 is projected and is in engagement with the step 280, as shown in Fig. 24, the player arm 253 is in initial record playing position and that when the plunger 276 is retracted away from the flange 279, the player arm follows it until the stylus engages the record at initial record engaging position. The plunger 276 is withdrawn completely from the flange 279 leaving the player arm free for playing cooperation with the record. It is to be noted that before this occurs, the yoke 261 is swung in the counterclockwise direction, as viewed in Fig. 24, removing the projection 282 away from the projection 281 leaving the player arm 253 conditioned for free rotation about both axes and controlled only by the engagement of the stylus with the record. Upon the hub 255 of the player arm, I adjustably mount a weight 283 which is adjusted so as to apply the desired pressure on the stylus and to bias the player arm downwardly very slightly when the player arm is moved out to and beyond initial record engaging position. The bias thus provided is sufficient to cause the player arm to swing in the counterclockwise direction, as viewed in Fig. 24, to bring the step 208 into engagement with the plunger 276. It may here be noted that the player arm is elevated away from the record by engagement of the plunger 276 with the flange 279 and that the player arm is moved out beyond initial record engaging position by the movement of the yoke 261 in the clockwise direction, as viewed in Fig. 24. After a record has been secured on the support 208, the yoke 261 is moved in the counterclockwise direction, as viewed in Fig. 24, and the player arm 253 follows it as a result of the bias just referred to until the step 280 engages the plunger 276. The projection 282 then moves away from the projection 281. The plunger 276 is then withdrawn, the player arm 253 following it until arrested by engagement of the stylus with the record. Continued withdrawing movement of the plunger 276 removes it completely from contact with the flange 279 so that the player arm 253 is free to play the record.

The movements of the yoke 261 and the plunger 276 are controlled by the movements of the member 267 rigidly secured to the sleeve 262 and the cam 275 carried thereby. Fig. 23 shows the relation of these elements when the player arm is in its most outward position, the stylus being elevated or laterally displaced from the record position. When the main cam member 117 starts to rotate in one direction or the other, the transfer arm goes into operation immediately to transfer a record from the magazine substantially into record gripping position. While this is occurring, the roller 203 is riding over an arcuate surface of its cam 202. After a record has been thus transferred, the shafts 201 and 205 are rotated, the first two effect the gripping of the record onto the record support, rotating the shaft 205 in the counterclockwise direction, as viewed in Fig. 23, moving the link 271 upwardly, as viewed in that figure, and effecting counterclockwise movement of the yoke 261, as viewed in Fig. 24. As previously described, the player arm 253 also moves in the counterclockwise direction until arrested by the step 280. Continued movement of the link 271 in the upward direction, as viewed in Fig. 23, moves a gentle fall 284 past the plunger 276 so that the plunger moves gently to the right, the player arm 253 following it until the stylus 254 engages the record 61. This continued movement of the link 271 withdraws the projection 282 (Fig. 4) from the projection 281 leaving the player arm supported in initial record engaging position by engagement of the step 280 with the plunger 276. Continued movement of the link 271 carries a steeper fall 285 on the cam 275 past the plunger 276 so that the plunger is withdrawn more rapidly and completely out of engagement with the flange 279 leaving the player arm 253 completely free except for the engagement of its stylus with the record. After a record is played the main cam gear is given another half revolution. The cam 202 is arranged so as to initiate immediately the reverse movement of the link 271, that is, the downward movement of this link, as viewed in Fig. 23, so that the plunger 276 is immediately actuated by the sharp rise 285 of the cam 275. The outer end of the plunger 276 engages the flange 279 and displaces the stylus 254 away from the played record before that record is released. Continued movement of the link 271 in this reversed direction 282 causes clockwise rotation of the yoke 261, as viewed in Fig. 24, so that the projection 282 engages the projection 281 on the player arm and carries the player arm out beyond its initial record engaging position, as shown in Fig. 23.

Upon the end of the shaft 258 and adjacent the bearing 264 (Fig. 23) is secured a member 286. The member 286 is provided with two depending arms 287 and 288, as best seen in Fig. 2. These arms are arranged to cooperate with the actuating arm 289 of a light over-center switch 290. When the player arm 252 is moved to its outer position, as shown in Fig. 2, the arm 288 engages the arm 289 and snaps the switch 290 to open position. At the end of the playing of the record, that is, when the player arm 252 has been moved into its inner position by the grooves of the record, the arm 287 snaps the switch 290 into open position in which it is held by the over-center spring 291. The switch 290 is mounted on the frame member 197 of the player unit. The member 267 which carries the cam 275 is arranged to cooperate with the common pole 292 of two switches 293 and 294 also mounted on the frame member 197, as best seen in Fig. 2. The arrangement is such that when the player arm 252 is moved outwardly, as shown in Fig. 2, the switch 293 is closed and the switch 294 is opened. On the next half revolution movement of the main cam member 147 during which the link 271 moves upwardly, as viewed in Fig. 23, to apply the stylus to the record, the member 267 engages the switch pole 292 opening the switch 293 and closing the switch 294.

The selector 65 which is mounted on the rear of the magazine supports 64 is provided with two series of electromagnets 295 and 296 (Fig. 26). The magnets of each series have the same spacing as the record spaces of the magazine. The magnets 296 correspond to the right-hand sides of the records, as viewed from the front of the machine, and the magnets 295 correspond with the left-hand sides of the records. Each series has a magnet corresponding to each record space in the magazine. Each magnet 295 has associated therewith an individual armature 297. Each electromagnet 296 has associated therewith an armature 298. Each armature 297 and 298 has associated therewith a washer 299 which always engages a conductive strip 300. When a selection is made by energizing one of the electromagnets 295 or 296, the armature 297 or 298, as the case may be, is moved outwardly from the center of the selector, as viewed in Fig. 26. When this occurs the associated washer 299 bridges across the contact strip 300 and another contact strip 301, thus establishing a circuit between the strip 300 and one of the strips 301. At the same time the armature 297 or 298, as the case may be, is actuated into alignment with a contact 302 or 303 respectively. The contacts 302 and 303 are carried by the slider 162 which moves with the carriage 33, as has been previously described. The slider 162 carries two solenoids 304 and 305 arranged to return the armatures 297 and 298 to normal position. It may here be pointed out that when the carriage is moving to the left and the playing unit is arranged to play the left-hand side of a record, the contact 302 may be brought into engagement with an actuated left side armature 297 with the result that the drive of the carriage is terminated and the corresponding record is moved out for playing its left-hand side. When the carriage is thus arrested the plunger of the solenoid 304 is aligned with the arresting armature 297 and when the solenoid 304 is energized, in manner hereinafter to be described, the arresting armature 297 is returned to its normal non-selecting position. As will hereinafter appear, while the carriage is moving to the left the circuits of the contact 303 and the solenoid 305 are open so that these elements remain inoperative. When, however, the carriage is moving to the right the circuits of the contacts 303 and the solenoid 305 are conditioned for operation and the circuits of the contact 302 and the solenoid 304 are open. Consequently, the carriage is arrested when an actuated armature 298 engages the contact 303 for the playing of the right-hand side of the corresponding actuated armature 298. Subsequent energization of the solenoid 305 effects the return of the arresting armature 298 to its normal position.

Referring more particularly to Fig. 26, the power is supplied to the machine by power lines 306, one of each includes an on and off switch 307. One power line is connected through the switch 308 of the play control relay 309. The other side of the switch is connected to the turntable motor 220, the other side of which is connected to the other power line. The other side of the switch 308 is also connected to one side of a switch 310 and to one side of the switch 293. The common pole 291 of the switches 293 and 294 is connected to terminals of the reversing motor 66. The other side of the switch 310 is connected to the switch 294. The switch 310 is arranged to be closed by a solenoid 311. The common pole 176 of the switches 181 and 182 is connected to the other power line. The other side of the switch 181 is connected to the left-hand terminal 312 of the motor 66 and the other side of the switch 182 is connected to the right-hand terminal 313 of the reversible motor 66. It will thus be seen that the motor 66 will operate when switches 307 and 308 are closed and when either the switch 293 is closed or when both the switches 294 and 310 are closed. The circuit of the reversible motor 66 includes either switch 181 or 182. When 181 is closed the motor rotates in direction to drive the carriage to the left, the playing unit being arranged to play the left-hand sides of the records. When the switch 182 is closed the motor 66 will operate in the reverse direction conditioning the carriage for drive towards the right, the playing unit being arranged to play the right-hand sides of records. Across the power lines 306, I provide a transformer 314 arranged to supply twenty-five volts. One side of the secondary is grounded. The undergrounded side is connected to the strips 301 and to one side of the switch 175 which is momentarily closed each time the transfer arm returns to its normal position. The ungrounded side of the secondary is also connected to one side of the switch 195, one side of one of the switches 194 and to one side of the trip switch 290. The strip 300 is connected to one side of the relay 309, the other side of which is grounded. It will thus be apparent that when one or more of the armatures 297 or 298 are in displaced or selecting position, the strip 300 being electrically connected by one or more of the washers 299 to one or both strips 301, the relay 309 will be energized and when all the armatures 297 and 298 are returned to their normal position, the relay 309 is deenergized and the switch 308 is open. It will readily be understood that when the switch 308 is closed, the turntable motor 220 is in operation and the reversible motor 66 is conditioned for operation in the circumstances just mentioned. The other side of the switch 173 is connected to the ungrounded side of the solenoid 100, to one side of the other switch 195 and to one side of both switches 196. The other sides of the switches 195 are connected together. One side of the other switch 194 is connected to the solenoid 95 and to the common pole of the switches 183 and 184. The other side of the solenoid 95 is grounded. The other sides of the two switches 194 are connected together. The other sides of the switches 196 are individually connected to the solenoids 304 and 305, the other sides of which are grounded. It is to be noted that when the playing unit is conditioned for playing the right-hand sides of records, the switch 196 associated with the solenoid 305 is closed and the switch 196 associated with the left-hand solenoid 304 is open. The other side of the trip switch 290 is connected to the solenoid 311, to the solenoid 146, and to the common pole of the switches 183 and 184, which has been previously pointed out, is also connected to the solenoid 95 and to one of the switches 194. The other side of the solenoid 311 is grounded.

The operation is as follows: Fig. 26 diagrammatically shows the mechanism conditioned for right-hand movement of the carriage and for playing the right-hand sides of records. The right-hand side of a record has been played and returned to the magazine momentarily closing the switch 173, returning the last displaced armature 298 corresponding to the last played record and energizing the solenoid 100 so that the clutch member 82 is in engaged position conditioning the machine for scanning travel towards the right, the master switch 307 is closed and all the solenoids are deenergized. The player arm having been moved outwardly, the switches 290, 293 and 294 are in the condition shown in Fig. 26. Assuming that a selection is made for a right-hand record to the right of the present position of the carriage, the corresponding armature 298 is moved into alignment with the contact 303 on the slider 162. This movement of the armature connects the strip 300 to the right-hand strip 301 so that the secondary of the transformer 314 is connected to the relay 309 closing the switch 308. The turntable motor 220 is thus started and the motor 66 is put into operation to drive the carriage towards the right. The circuit of the motor is through the switch 182, the right-hand terminal 313 of the motor, switch 293 and the switch 308. The carriage now moves to the right until the contact 303 engages the displaced armature or selector member 298, which is grounded. A circuit is now completed from ground through the displaced or selecting contact 298, contact 303, switch 184 to the solenoid 95, solenoid 146 and solenoid 311. The energization of the solenoid 95 disengages the clutch member 82 which is latched in disengaged position by the latch member 97. The energization of the solenoid 146 actuates the aligned dog 140 so as to release the dog 123 adjacent the pinion 73 so as to initiate half a revolution of the mutilated gear 117 in the manner previously described. The energization of the solenoid 95 also causes the roller 191 (Fig. 17) to engage the star wheel 81 so as to position the carriage so as to locate the record transfer arm 156 in alignment with the selected record. It may here be noted that when the carriage is in this position, the contact 303 is moved past the arresting armature 298 so that the solenoids 95, 146 and 311 are promptly deenergized. The half revolution of the mutilated gear 117 results in the transfer of a record from the magazine to the playing unit, the gripping of the record to the record support 208 and the application of the stylus 254 in initial record engaging position with the record in manner previously described. The right-hand side of the record is now played. As has been previously described, the application of the player arm to the record is effected by the movement of the link 271 upwardly, as viewed in Fig. 23. At the end of this movement the member 267 closes the switch 294 and opens the switch 293 (Fig. 26).

The opening of the switch 293 terminates the operation of the motor 66 since the switch 310 is open, thus the motor 66 remains out of operation during the playing of a record.

At the end of the playing of the record when the player arm has moved inwardly sufficiently, the arm 287 of the member 286 engages the actuating arm 289 of the switch 290 and closes this switch. The secondary of the transformer 314 is now connected through the switch 290 to the solenoids 311, 146 and incidentally to the solenoid 95. This energization of the solenoid 95 has no effect since the clutch member 82 is being maintained in inoperative position by the latch 97. The solenoid 146 effects engagement of the mutilated gear 117 with the pinion 73 to effect another half revolution of the mutilated gear 117. The energization of the solenoid 311 closes the switch 310 so that the motor 66 is put into operation, its circuit being completed through switches 182, 294, 310 and 308 all of which are closed. The second half revolution of the mutilated gear 117 effects the displacement of the stylus from the record and the outward movement of the player arm, the release of the record from the record support 208 and finally the return of the record to the magazine. It is to be noted that when the link 71 begins to move downwardly, as viewed in Fig. 23, member 267 moves away from the switch pole 292 opening the switch 294 and closing the switch 293. It is to be noted that the blades of the switches 293 and 294 are arranged so that one switch closes before the other one opens. Consequently the motor 66 remains in operation by the circuit through the switch 293 instead of the circuit through the switches 294 and 310. After the closing of the switch 293 the arm 288 of the member 286 engages the actuating arm 289 of the switch 290 and opens this switch deenergizing the solenoids 311, 146 and 95. At this time the clutch member 82 is latched in its deenergized position by the latch member 97. The player arm being moved to its outermost position very early in the second half cycle of the mutilated gear 117 so that the carriage remains stationary until the played record is returned to the magazine, the player arm 156 attains its lowermost position closing the switch 173 momentarily. The momentary closing of the switch 173 energizes the solenoids 100 and 305. The solenoid 305 returns the arresting armature 298 to inoperative position and the solenoid 100 actuates the latch 97 allowing the clutch member 82 to descend into clutching position. If only one selection had been made, the return of the arresting armature 298 deenergizes the relay 309 and opens the switch 308 so that the machine becomes inoperative.

If it is assumed that the left-hand side of a record is selected by the energization of one of the magnets 295, this armature is then located in the path of the contact 302 and the circuit of the relay 309 is completed so that the switch 308 is closed. The carriage resumes its right-hand movement and it is to be noted that during this movement, the contact 302 may engage the displaced left-hand armature or contact 297 without result since the circuit of the contact 302 is open at the switch 183. Since no right-hand armature 298 is in selecting position the carriage completes its full travel to the right whereupon the switch actuating arm 51 engages the right-hand stop 49 and the switches 182 and 184 are opened and switches 181 and 183 are closed. The switch 181 being connected to the left-hand terminal of the motor 66, the motor is immediately reversed and drives in the opposite direction. The switch 185 is closed temporarily connecting the secondary of the transformer 314 to the relays 311, 146 and 95. The energization of the relay 311 has no effect since the switch 294 is open. The energization of the solenoid 146 initiates a half revolution of the mutilated gear 117 in the opposite direction, that is, the counter-clockwise direction, as viewed in Figs. 9, 13 and 15. The energization of the relay 95 disengages the clutch member 82 which is latched up by the latch 97. This reversal occurs when the transfer arm 156 is down and the roller 206 on the player unit is engaged by the clip 207 on the main cam member 114, as best shown in Fig. 13. The engagement between the roller 206 and 207 is sufficiently strong to disengage the engaged pin 192 from its latch 190. Consequently, during this half revolution, the player unit is carried with the mutilated gear through 180° conditioning it for the playing of the left-hand sides of records. When both latches 190 are disengaged by their pins 192 during this first half revolution in the reversed direction, both switches 196 are open, both switches 194 are closed and both switches 195 are closed. The secondary of the transformer 314 is connected through the two close switches 194 to the solenoids 95, 146 and 311. Again the energization of the solenoid 311 has no effect since the switch 294 is open. The closing of the two switches 195 connects the secondary of the transformer to the solenoid 100. It is to be noted that near the end of the half revolution of the player unit, the other pin 192 engages the other stop latch member 190 opening one of the switches 194, then opening the associated switch 195 and finally closing the associated switch 196 which is connected to the solenoid 304. Since the switch 194 opens before the switch 195, the solenoid 95 is deenergized before the solenoid 100 thus allowing the clutch 82 to become engaged to initiate travel towards the left. It is to be noted that these switches are actuated before the completion of the first reversed half of the revolution and that the solenoid 146 is deenergized before its armature fouls the other dog 140. During the first reversed half revolution of the cam gear 117, the transfer arm, the player arm control mechanism and the gripping mechanism are not actuated. The pin 118 (Figs. 13 and 15) merely moves freely through 180° in the slot 119 to reach operative position for record transfer for the playing of the left-hand sides of the records selected. The roller 206 of the player unit being clutched to the clip 207, the player unit moves with the mutilated gear and the main cam member 114 so that there is no relative movement between the cams, the rollers 199 and 203. It is to be noted that on the next half revolution of the cam gear in the same reversed direction, the player unit is unable to follow the cam gear on account of the appropriate pin 192 being engaged by a stop latch 190. Consequently the lip 207 moves away from the roller 206 and the next record is moved out for playing during the second half revolution in the same reversed direction. Owing to the engagement of the clutch member 182 as just described, the carriage is driven to the left until arrested by the actuated armature 197 whereupon the corresponding record is moved out, played and returned to the magazine, the arresting armature being returned to inoperative position by the left-hand solenoid 304. Owing to the reversal of the playing unit just described the left-hand side of the record will be played. It will be understood that any number of the armatures 297 and 298 may be moved into selecting position by energization of their individual magnets 295 and 296 with the result that the corresponding sides of the records will be played. As long as any one of these armatures is in selecting position, the play control relay 309 remains energized and the machine remains in operation until the record corresponding to the last displaced armature has been reproduced and returned to the magazine. When that occurs, the switch 173 closes, the last displaced armature is returned to inoperative position and the circuit of the play control relay 309 is broken terminating the operation of the machine.

Although the present invention has been described in connection with the specific details of a preferred embodiment thereof, it must be understood that such details are not intended to be limitative of the invention except in so far as recited in the accompanying claims.

Having thus described my invention, I declare that what I claim is:

1. In combination, a rotatable record support, a head carried by said support and arranged to be projected out of, and withdrawn into said support, a plurality of dogs movably mounted in said head, and means for moving said dogs into said head when the head is withdrawn and for moving said dogs out of said head towards the adjacent portions of the record support when the head is projected.

2. In a phonograph, a rotatable record support, a head on said support arranged to be projected through the central opening of a record and retracted into said support, a plurality of dogs pivotally mounted on said head and arranged to be retracted thereinto, means for swinging said dogs out of said head into record gripping position when the head is projected and for swinging them into the head when the head is retracted.

3. In a phonograph, in combination, a record support, a central head arranged to be withdrawn into said support and projected therefrom to enter the central opening of a record, a plurality of dogs movable into said head and arranged to be projected therefrom so as to grip a record to said support, and means effective when the head is projected to swing the dogs into record gripping position and to withdraw them into the head when the head is withdrawn into the record support.

4. In a phonograph, in combination, a record support, a central head arranged to be withdrawn into said support and projected therefrom to enter the central opening of a record, a plurality of dogs movable into said head and arranged to be projected therefrom so as to grip a record to said support, a member connected to an intermediate portion of each dog, and stop means associated with the support and each member arranged to be brought into engagement during outward projection of the head, whereby the intermediate portion of the connected dog is arrested and the dog is caused to swing outwardly into record gripping position.

5. In a phonograph, in combination, a rotatable record support, a member having a record supporting surface, a transfer arm arranged to supply a record to said surface into a position slightly out of alignment with the axis of the support, a central head on said support arranged to be projected out of, and withdrawn into said support, a fence in spaced relation to said support, said head having an outer cam surface arranged to cam the record out of contact with said surface when the head is projected into its central opening, a plurality of gripping members on said head, and means for moving said gripping members into the head when the head is withdrawn and for moving said gripping members out of the head to grip the record to the support when the head is projected.

References Cited in the file of this patent

UNITED STATES PATENTS

| | | |
|---|---|---|
| 1,789,810 | Ebeling | Jan. 20, 1931 |
| 2,293,219 | Rieber | Aug. 18, 1942 |
| 2,406,355 | Darwin et al. | Aug. 27, 1946 |
| 2,488,260 | Ascoli | Nov. 15, 1949 |
| 2,509,811 | Dale | May 30, 1950 |
| 2,581,345 | Andrews | Jan. 8, 1952 |